(12) United States Patent
Ghebremeskel et al.

(10) Patent No.: US 11,787,928 B2
(45) Date of Patent: Oct. 17, 2023

(54) POLYVINYL ALCOHOL COMPOSITIONS HAVING IMPROVED PARTICLE SIZE DISTRIBUTION

(71) Applicant: KURARAY CO., LTD., Kurashiki (JP)

(72) Inventors: Ghebrehiwet Ghebremeskel, Houston, TX (US); Keisuke Morikawa, Houston, TX (US); Richard Cazares, Houston, TX (US); Masaki Kato, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 327 days.

(21) Appl. No.: 17/159,254

(22) Filed: Jan. 27, 2021

(65) Prior Publication Data
US 2021/0238401 A1    Aug. 5, 2021

Related U.S. Application Data

(60) Provisional application No. 62/967,956, filed on Jan. 30, 2020.

(51) Int. Cl.
*C08L 29/04* (2006.01)
*C09K 8/12* (2006.01)
*C08J 3/12* (2006.01)

(52) U.S. Cl.
CPC ........... *C08L 29/04* (2013.01); *C08J 3/12* (2013.01); *C09K 8/12* (2013.01); *C08L 2205/03* (2013.01)

(58) Field of Classification Search
CPC .................. C08L 29/04; C08J 3/12
See application file for complete search history.

(56) References Cited

U.S. PATENT DOCUMENTS 5,811,488 A * 9/1998 Narumoto ........... C08J 3/12
                                                525/62
2020/0071599 A1 * 3/2020 Ghebremeskel ....... C08J 3/12

* cited by examiner

*Primary Examiner* — Mark S Kaucher
(74) *Attorney, Agent, or Firm* — Oblon, McClelland, Maier & Neustadt, L.L.P.

(57) ABSTRACT

Disclosed are particulate polyvinyl alcohol-based compositions for use in manufacturing chemical materials and in other industrial operations, and for treatments applied to a subterranean formation traversed by the borehole of an oil or gas well, which compositions are prepared by granulating polyvinyl alcohol polymers, and admixing the granules so produced with powder and/or crushing the granules to a specified particle size distribution.

14 Claims, 2 Drawing Sheets

US 11,787,928 B2

POLYVINYL ALCOHOL COMPOSITIONS HAVING IMPROVED PARTICLE SIZE DISTRIBUTION

CROSS-REFERENCE TO RELATED APPLICATIONS

This application claims priority under 35 U.S.C. § 119 from U.S. Provisional Application Ser. No. 62/967,956, filed 30 Jan. 2020, the disclosure of which is incorporated by reference herein for all purposes as if fully set forth.

This application is related to commonly-owned U.S. patent application Ser. Nos. 16/554,078, 16/554,231, 16/554,177 and 16/554,126, all filed on 28 Aug. 2019, and all of which are incorporated by reference herein for all purposes as if fully set forth.

FIELD OF THE INVENTION

This invention addresses the particle size distribution of particulate, polyvinyl alcohol-based compositions, which can be used in manufacturing operations and are frequently also used as diverting agents and/or for minimizing or eliminating loss of circulation of fluids during the process of well drilling, workover, completion and cementing. In particular, this invention relates to particulate, water-soluble polymer compositions manufactured by granulation of a polyvinyl alcohol polymer (and/or copolymer) gel body, optionally blended with one or more specified additives and/or other polymers, wherein the compositions have a desirably low content of dust and, also desirably, have a relatively dense particle size distribution.

BACKGROUND OF THE INVENTION

Polyvinyl alcohol ("PVOH") is a widely known and versatile industrial material. It is routinely used for the purpose of fabricating films, fibers and other shaped objects such as containers and devices for packaging, drug delivery and wound management. It is also experiencing growing use as a component in various compositions employed for the purpose of adjusting the permeability of a subterranean formation that is traversed by the borehole of a well drilled to enable the production of hydrocarbons.

Adjustments to the natural permeability of underground geologic formations are frequently employed by drilling and production interests either to direct the application of a displacing fluid to precisely one or more specific zones of an oil-bearing formation; or to reduce, or prevent, the loss to permeable and porous zones of the traversed formation of muds or other circulation fluids that are used throughout the wellbore to remove cuttings, counterbalance formation pressure and maintain hole stability. Compositions formed for injection or insertion into the subterranean geology traversed by a borehole are exposed to a variety of conditions, and polyvinyl alcohol is finding favor as a component of such compositions because of its varying degree of solubility in water in the presence of the different types of environments found in the borehole.

In view of the great variety of uses to which polyvinyl alcohol is being devoted, the material that is output from the polymer synthesis process will desirably be made available in many different particle sizes. Particle size can be affected by the particular synthesis process by which it is made, but particle size coming out of the reactor, and particle size distribution, can also be affected by steps that are taken post production.

Although polyvinyl alcohol particle size is discussed in the art, it appears that little attention is given to processes that could be used specifically to provide PVOH in a desirably large range of different particles size distributions. For example, U.S. Pat. No. 3,427,298 discloses making crystals of PVOH in a flat, flake shape, but these are typically then be crushed to make primarily very small ultrafine particles that are 350 mesh size or smaller. Similarly, although U.S. Pat. No. 5,811,488 discloses the production of polyvinyl alcohol particles by the wet granulation of a gel, it teaches that <3 wt % of the particles produced thereby should have an average diameter of 574 microns, and that the average diameter of the particles should be 54,000 microns. This reference thus offers limited guidance concerning useful amounts, in a polyvinyl alcohol composition, of particles that are in the variety of different size ranges running from small to large.

It thus remains desirable to have particulate polyvinyl alcohol compositions, and processes and methods for providing them, wherein the compositions have improved utility and performance for use in downhole operations as diverting agents or as lost circulation materials, as well as in use for other manufacturing purposes, which compositions are characterized by a tailored particle size distribution.

SUMMARY OF THE INVENTION

In view of this need in the art to obtain and provide improved polyvinyl alcohol compositions, it is proposed herein to provide polyvinyl alcohol compositions that are composed of controlled amounts of particles that are in the small, medium and large size ranges. It has been found that controlling the relative amounts of particles in a polyvinyl alcohol composition that are in the small, medium and large size ranges in accordance with this invention is a useful way to obtain a particle size distribution that is relatively dense, and to obtain particles having different sizes that, as a composition, are useful for a variety of purposes, and that are not disadvantaged by the presence of dust therein.

As it is believed that the amount of dust, i.e. ultrafines and other particles of extremely small size, may be an important determinant of whether a PVOH composition is suitable for use in the oil industry in a downhole environment, as well as in other applications, and may also be an important determinant of whether a PVOH composition can be safely and conveniently handled, it would be technically advantageous to be able to provide polyvinyl alcohol compositions having a desirably low content of ultrafine, extremely small particles, and also having a relatively dense particle size distribution. A relatively dense particle size distribution or gradation is believed to be desirable since it is characterized as one in which most of the particles are in the medium to large size ranges but there are still enough smaller particles to fill the voids between the larger particles, but there is at the same time substantially no content of ultrafines or dust (e.g. particles that are smaller than 325 mesh size).

It is therefore proposed, in one aspect of this invention, to provide a first process for preparing a particulate polyvinyl alcohol composition, comprising the steps of:

(1) providing a polyvinyl alcohol in a liquid solvent in a reactor,
(2) recovering the polyvinyl alcohol from the reactor in the form of a deposit in, on or onto a receptacle wherein the deposit undergoes gelation to form a body that corresponds substantially to the shape of the receptacle,
(3) granulating the body to form a polyvinyl alcohol granule composition comprising at least about 90 wt % polyvinyl alcohol granules (as subsequently defined) (based on the total weight of the polyvinyl alcohol granule composition composition), and (4) admixing the polyvinyl alcohol granule composition with from about 0.5 wt % to about 20 wt % (based on the total weight of the particulate polyvinyl alcohol composition) of a polyvinyl alcohol powder composition to form the particulate polyvinyl alcohol composition, wherein the polyvinyl alcohol powder composition comprises (i) a polyvinyl alcohol powder (as subsequently defined) that is smaller than 80 mesh size and is 325 mesh size or larger, or (ii) a polyvinyl alcohol powder that is 80 mesh size or larger and smaller than 35 mesh size, or (iii) a combination of (i) and (ii).

In another aspect of this invention, this is provided a first particulate polyvinyl alcohol composition comprising:

(a) from about 70 wt % to about 99.5 wt % of polyvinyl alcohol granules,
(b) from about 0.5 wt % to about 20 wt % of (i) a polyvinyl alcohol powder that is smaller than 80 mesh size and is 325 mesh size or larger, or (ii) a polyvinyl alcohol powder that is 80 mesh size or larger and smaller than 35 mesh size, or (iii) a combination of (i) and (ii), and
(c) less than about 10 wt % combined of polyvinyl alcohol bigs (as subsequently defined) and polyvinyl alcohol ultrafines (as subsequently defined), wherein wt % is based on the total weight of the particulate polyvinyl alcohol composition.

In one embodiment, such first particulate polyvinyl composition is produced by such first process.

In yet another aspect of this invention, there is provided a second process for preparing a particulate polyvinyl alcohol composition, comprising the steps of:

(1) providing a polyvinyl alcohol in a liquid solvent in a reactor,
(2) recovering the polyvinyl alcohol from the reactor in the form of a deposit in, on or onto a receptacle wherein the deposit undergoes gelation to form a body that corresponds substantially to the shape of the receptacle,
(3) granulating the body to form a polyvinyl alcohol granule composition comprising at least about 90 wt % polyvinyl alcohol granules (based on the total weight of the polyvinyl alcohol granule composition composition), and
(4) crushing the polyvinyl alcohol granule composition to form the particulate polyvinyl alcohol composition, wherein at least about 80 wt % of the particles in the particulate polyvinyl alcohol composition have a size that is 80 mesh or larger, based on the total weight of the particulate polyvinyl alcohol composition.

In yet another aspect of this invention, there is provided a second particulate polyvinyl alcohol composition which is a mixture of crushed polyvinyl alcohol granules and uncrushed polyvinyl alcohol granules, wherein at least about 80 wt % of the particles in the mixture have a size that is 80 mesh or larger, and wherein less than about 10 wt % combined of the particles are polyvinyl alcohol bigs and polyvinyl alcohol ultrafines, wherein wt % is based on the total weight of the particulate polyvinyl alcohol composition.

In one embodiment, such second particulate polyvinyl composition is produced by such second process.

In yet another aspect of this invention, there is provided a process for preparing a polyvinyl alcohol reaction product, comprising the steps of:

(1) providing a polyvinyl alcohol in a liquid solvent in a reactor,
(2) recovering the polyvinyl alcohol from the reactor in the form of a deposit in or on a receptacle wherein the deposit undergoes gelation to form a body that corresponds substantially to the shape of the receptacle,
(3) granulating the body to form a particulate polyvinyl alcohol composition comprising at least about 90 wt % polyvinyl alcohol granules (based on the total weight of the polyvinyl alcohol granule composition composition), and wherein the polyvinyl alcohol granules have a content of a monohydric alcohol that is about 5 wt % or more, and
(4) contacting the polyvinyl alcohol granules with an aldehyde or a ketone in a solution to form a polyacetal.

In yet another aspect of this invention, there is provided a method of fabricating a film or fiber, comprising the steps of:

(1) providing a polyvinyl alcohol in a liquid solvent in a reactor,
(2) recovering the polyvinyl alcohol from the reactor in the form of a deposit in or on a receptacle wherein the deposit undergoes gelation to form a body that corresponds substantially to the shape of the receptacle,
(3) granulating the body to form a particulate polyvinyl alcohol composition comprising at least about 90 wt % polyvinyl alcohol granules (based on the total weight of the polyvinyl alcohol granule composition composition), and wherein the polyvinyl alcohol granules have a content of a monohydric alcohol that is about 5 wt % or more,
(4) forming a solution from the particulate polyvinyl alcohol composition, and
(5) casting a film, or spinning a fiber, from such solution.

In yet another aspect of this invention, there is provided a process for preparing a polyvinyl alcohol reaction product, comprising the steps of:

(1) forming a solution from a particulate polyvinyl alcohol composition comprising at least about 90 wt % polyvinyl alcohol granules (based on the total weight of the polyvinyl alcohol granule composition composition), and wherein the polyvinyl alcohol granules have a content of a monohydric alcohol that is less than about 5 wt %, and
(2) contacting the solvated polyvinyl alcohol granules with an aldehyde or a ketone in the solution to form a polyacetal.

In yet another aspect of this invention, there is provided a method of fabricating a film or fiber, comprising the steps of:

(1) forming a solution from a particulate polyvinyl alcohol composition comprising at least about 90 wt % polyvinyl alcohol granules (based on the total weight of the particulate polyvinyl alcohol granule composition composition), and wherein the polyvinyl alcohol granules have a content of a monohydric alcohol that is less than about 5 wt %, and
(2) casting a film, or spinning a fiber, from such solution.

In yet another aspect of this invention, there is provided a method of reducing the loss of one or more desired fluids from a subsurface formation, or from the confines of a wellbore installed within such formation, comprising the step of applying a particulate polyvinyl alcohol composition to a wall of the formation that is accessible from the wellbore, wherein the particulate polyvinyl alcohol composition comprises at least about 90 wt % of polyvinyl alcohol granules (based on the total weight of the particulate polyvinyl alcohol granule composition composition), and wherein the polyvinyl alcohol granules have a content of a monohydric alcohol that is less than about 5 wt %.

In yet another aspect, this invention provides the product prepared by or resulting from any one of the processes or methods set forth herein.

The compositions of this invention are particularly suitable for use in subterranean formations where formation temperatures are typically about 200° F. or lower, although, in some cases, these compositions have suitable stability for sufficient time periods to be used at temperatures of up to about 250° F. A particular advantage of the polyvinyl alcohol-based compositions hereof for downhole applications is that they are environmentally friendly as they are temporary, and are considered non-toxic and biodegradable.

Additionally, however, a polyvinyl alcohol composition in accordance with this invention can be utilized, for example, in adhesive compositions, in paper coating compositions, as emulsion stabilizers, in pulp, as the base resin for producing other materials such as polyvinyl butyral (PVB), as well as for various film and glass fiber end uses. Although there are certain advantages to using particulate polyvinyl alcohol compositions containing relatively large amounts of ultrafines in relation to water slurrying, the reduction in the dust content of a particulate polyvinyl alcohol composition provides a notable benefit in almost all manufacturing operations since the presence of ultrafines is generally undesirable as it may constitute a health risk when inhaled, and a safety risk as it may be relatively easily ignited.

These and other embodiments, features and advantages of this invention will be more readily understood by those of ordinary skill in the art from a reading of the following detailed description.

DETAILED DESCRIPTION

Figure 1:
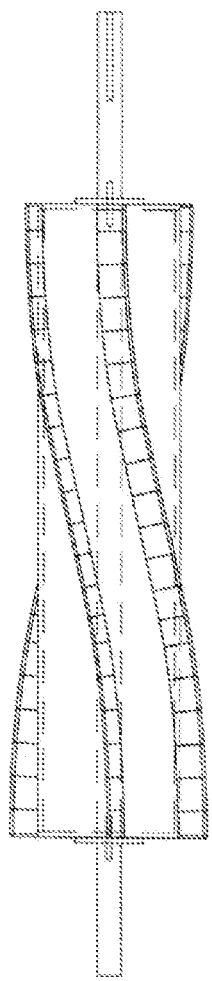
FIG. 1 is a schematic view of a rotating spiral knife suitable for use in granulating a body undergoing gelation in the processes of the invention.

This invention relates to particulate polyvinyl alcohol compositions having a reduced dust content and, desirably, a relatively dense particle size distribution. These compositions are manufactured from granulated polyvinyl alcohol polymers and/or copolymers, and find substantial use in downhole applications in subterranean treatments, and in various manufacturing operations.

In the context of the present description, all publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Unless stated otherwise, all percentages, parts, ratios, etc., are by weight.

Unless stated otherwise, pressures expressed in psi units are gauge, and pressures expressed in kPa units are absolute. Pressure differences, however, are expressed as absolute (for example, pressure 1 is 25 psi higher than pressure 2).

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of claim elements is not necessarily limited to only those elements but can include other elements not expressly listed or inherent to such process, method, article, or apparatus.

The transitional phrase "consisting of" excludes any claim element or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified claim elements, materials or steps and those others that do not materially affect the basic and novel characteristic(s) of the claimed invention. A "consisting essentially of" claim thus occupies a middle ground between closed claims that are written in a "consisting of" format, and fully open claims that are drafted in a "comprising" format. Optional additives as defined herein, at a level that is appropriate for such additives, and minor impurities are not excluded from a composition by the term "consisting essentially of".

Further, unless expressly stated to the contrary, "or" and "and/or" refers to an inclusive and not to an exclusive. For example, a condition A or B, or A and/or B, is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The term "predominant portion", as used herein, unless otherwise defined herein, means that greater than 50% of the referenced material. If not specified, the percent is on a molar basis when reference is made to a molecule (such as hydrogen, methane, carbon dioxide, carbon monoxide and hydrogen sulfide), and otherwise is on a weight basis (such as for carbon content).

The term "substantial portion" or "substantially", as used herein, unless otherwise defined, means all or almost all or the vast majority, as would be understood by a person of ordinary skill in the relevant art in the context used. It is intended to take into account some reasonable variance from 100% that would ordinarily occur in industrial-scale or commercial-scale situations.

The term "depleted" or "reduced" is synonymous with reduced from originally present. For example, removing a substantial portion of a material from a stream would produce a material-depleted stream that is substantially depleted of that material. Conversely, the term "enriched" or "increased" is synonymous with greater than originally present.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising vinyl acetate and 15 mol % of a comonomer", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

The term "unit" refers to a unit operation. When more than one "unit" is described as being present, those units are operated in a parallel fashion unless otherwise stated. A single "unit", however, may comprise more than one of the units in series, or in parallel, depending on the context. For example, a thermal treating unit may comprise a first cooling unit followed in series by a second cooling unit.

The term "free-flowing" particles (or agglomerates) as used herein means that the particles do not materially further agglomerate (for example, do not materially further aggregate, cake or clump), as is well understood by those of ordinary skill in the relevant art. Free-flowing particles need not be "dry" but, desirably, the moisture content of the particles is substantially internally contained so that there is minimal (or no) surface moisture.

The term "D(X) particle size" means the diameter at which X % of the sample's mass is comprised of particles with a diameter less than this value. For example, "D(10) particle size" means the diameter at which 10% of the sample's mass is comprised of particles with a diameter less than this value, and "D(90) particle size" means the diameter at which 90% of the sample's mass is comprised of particles with a diameter less than this value.

Mesh sizes of wire screens set forth herein for use in size classification operations are taken from the American Standard Sieve Series (Standard Specification for Woven Wire Test Sieve Cloth and Test Sieves) according to ASTM Standard E11 (2019 version). The sizes of the particles that make up a particulate composition, and thus the particle size distribution thereof, can be determined by processing the composition through a nested set of vibrating sieves, each sieve having a tray floor that is a different mesh size screen, and that is smaller than the screen immediately above it. After all material has fallen through the set of sieves and is either retained on a sieve or has fallen to the bottom collection pan, the weight fraction of the starting composition can be determined for each mesh size by weighing the amount of material that is retained on that screen having such mesh size, thus determining a size gradation for the particles of the composition. The mass of the sample on each sieve is then divided by the total mass to give a percentage of the total retained on each sieve, and which fraction is thus classified by the size of the mesh opening on that screen. In either case, a particle size distribution for the particular polyvinyl alcohol composition source or batch may thus be determined.

When the size of a particle herein is described, for example, as "X mesh size or larger", this means that the particle would not pass through the screen opening for that specifically named mesh size, not that mesh sizes tied to a larger number are also being in that particular instance referred to. Similarly, when the size of a particle herein is described, for example, as "smaller than X mesh size", this means that the particle would pass through the screen opening for that specifically named mesh size, not that mesh sizes tied to a smaller number are also being in that instance referred to.

The term "big particle" or "bigs" means particles that are 3 mesh size or larger.

The term "ultrafine particles" or "ultrafines" means particles that are smaller than 325 mesh.

The term "powder" means particles that are 325 mesh or larger, and smaller than 35 mesh.

The term "granules" means particles that are 35 mesh or larger, and smaller than 3 mesh.

The term "substantially soluble in water" and "soluble in water" means substantially completely (or completely) soluble in deionized water under the stated conditions.

The term "substantially soluble in brine" and "soluble in brine" means substantially completely (or completely) soluble in brine (i.e. a water solution with NaCl concentration of up to 2.9 wt %) under the stated conditions.

The term "acid-soluble weighting agent" means a material that is soluble in an acidic medium, or reacts in acidic medium to result in a product that is soluble in water. For example, calcium carbonate reacts in an acidic medium to generate calcium salt that is soluble in water.

For convenience, many elements of this invention are discussed separately, lists of options may be provided and numerical values may be in ranges; however, for the purposes of the present disclosure, that should not be considered as a limitation on the scope of the disclosure or support of the present disclosure for any claim of any combination of any such separate components, list items or ranges. Unless stated otherwise, each and every combination possible with the present disclosure should be considered as explicitly disclosed for all purposes.

Although methods and materials similar or equivalent to those described herein can be used in the practice or testing of the present disclosure, suitable methods and materials are described herein. The materials, methods, and examples herein are thus illustrative only and, except as specifically stated, are not intended to be limiting.

Polyvinyl Alcohol Polymers

The polymers used in the manufacture of the compositions of this invention are polyvinyl alcohol based. The compositions hereof can contain polyvinyl alcohol homopolymers and/or copolymers, both of which are in a general sense well-known polymers and are generally commercially available in many forms for a variety of end-uses. A typical polyvinyl alcohol suitable for use herein is described in U.S. Pat. No. 4,119,604.

Polyvinyl alcohol is produced on a commercial scale by polymerizing a vinyl ester (with optional comonomers) to generate a polyvinyl ester, after which the ester groups are hydrolyzed to hydroxyl groups in varying degrees. Examples of vinyl esters suitable for use herein as a starting material include vinyl acetate, vinyl propionate, vinyl benzoate, vinyl stearate, vinyl versatate, vinyl pivalate, vinyl formate, vinyl valerate, vinyl caprinate, vinyl laurate, and vinyl carboxylate copolymers, such as ethylene-vinyl acetate copolymer. For reasons of economy, availability and performance, vinyl acetate is preferred. Several different hydrolysis methods are well-known and can be used for this purpose.

A polyvinyl acetate starting material is thus typically produced by the free radical polymerization of a vinyl acetate monomer in the presence of a polymerization catalyst. The solvent commonly used in the commercial polymerization of vinyl acetate is a hydrolytic alcohol such as methanol, ethanol, the propanols or the monomethyl ether of ethylene glycol. Methanol is preferred. The polymerization is typically conducted in the temperature range of from about 10° C. to about 80° C. The lower end of the polymerization range is known to give products with improved properties. The percent conversion of vinyl acetate to polyvinyl acetate can vary over a wide range. Though conversions ranging from about 20% to 100% have been found satisfactory, commercially at least about 30% conversion is preferable.

Polyvinyl alcohol polymers for use in this invention can include those prepared from polyvinyl acetate copolymers, such as hydrolyzed "acid-functional" polyvinyl acetate copolymers, which can contain one or more "acid-functional" comonomers. An "acid-functional" comonomer can be, for example, one or more of (i) a monocarboxylic unsaturated acid, (ii) a dicarboxylic unsaturated acid, (iii) an alkyl ester of (i), (iv) an alkyl ester of (ii), (v) an alkali metal salt of (i), (vi) an alkali metal salt of (ii), (vii) an alkaline earth metal salt of (i), (viii) an alkaline earth metal salt of (ii), (ix) an anhydride of (i), and (x) an anhydride of (ii).

Particular examples of such acid-functional comonomers include methacrylic acid, methyl methacrylate, 2-hydroxyethyl acrylate, hydroxyl methacrylate, ethyl methacrylate, n-butyl methacrylate, maleic acid, monomethyl maleate, dimethyl maleate, maleic anhydride, itaconic acid, monomethyl itaconate, dimethyl itaconate, and itaconic anhydride. Preferred are lower alkyl ($C_2$–$C_8$, or $C_2$–$C_4$) acrylates and methacryles. Non-limiting examples of such comonomers include methyl acrylate, methyl methacrylate, ethyl acrylate, ethyl methyacrylate, propyl acrylate, i-propyl methacrylate, n-propyl acrylate, n-propyl methacrylate, i-butyl acrylate, i-butyl methacrylate, n-butyl acrylate, n-butyl methacrylate, t-butyl acrylate, t-butyl methacrylate, ethylhexyl acrylate, ethylhexyl methacrylate and others. Preferred comonomers also include methyl acrylate, methyl methacylate and mixtures thereof, and particularly methyl acrylate. Examples of commercially available polyvinyl alcohols containing acid-functional comonomers include those available under the trade designation Kuraray POVAL™ K-series grades such as 32-97KL, 25-88KL, 6-77KL and 30-94KL (Kuraray Co., Ltd., Tokyo Japan), or ELVANOL™ 80-18 (Kuraray America, Inc., Houston, Tex. USA).

Other polyvinyl acetate copolymers useful herein to prepare a polyvinyl alcohol composition are those copolymers prepared from a vinyl ester, such as vinyl acetate as discussed above, and an olefinic comonomer. Suitable olefinic comonomers for use herein include without limitation ethylene, propylene, optionally branched $C_4$-$C_{20}$ α-olefins, optionally branched $C_4$–$C_{20}$ internal olefins, optionally branched $C_4$–$C_{20}$ vinylidene olefins, optionally branched $C_4$–$C_{20}$ cyclic olefins and optionally branched $C_4$–$C_{20}$ dienes, as well as optionally branched $C_4$–$C_{20}$ functionalized olefins. Any of the $C_4$–$C_{20}$ compounds listed in the preceding sentence may instead suitably be a $C_4$–$C_{12}$ or a $C_4$–$C_8$ compound. Examples of suitable olefinic monomers include without limitation ethylene, propylene, 1-butene, 1-pentene, 1-hexene, 4-methylpent-1-ene, 1-heptene, 1-hexene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecyl, 1-eicosene, styrene, 2-butene, 4-methyl-1-pentene, ethyl-1-hexene, cyclohexene, norbornene, mixtures thereof and the like. Preferred are ethylene in combination with a $C_3$–$C_8$ α-olefin; more preferred is ethylene. In addition, combinations of an acid-functional comonomer and an olefinic comonomer can also be used.

The comonomer content of a polyvinyl acetate copolymer (and thus the resulting polyvinyl alcohol copolymer) ranges from about 0.1 mol %, or from about 0.5 mol %, or from about 1 mol %, to about 15 mol %, or to about 10 mol %, or to about 8 mol %. In the case of methyl acrylate, the amount is typically about 10 mol % or less, based on the total moles of monomer. In the case of methyl methacrylate, the amount is typically about 5 mol % or less, based on the total moles of monomer. In the case of an olefinic comonomer, the amount could alternatively be about 0.5 mol %, or about 1 mol %, to about 6 mol %, or to about 4 mol %, or to about 3 mol %.

The viscosity-average degree of polymerization of polyvinyl acetate (and resulting polyvinyl alcohol) varies anywhere from about 200, or from about 300, or from about 400, or from about 500, or from about 700, to about 10,000, or to about 3000, or to about 2000. The viscosity-average degree of polymerization of a polyvinyl alcohol polymer is measured in accordance with JIS K6726 (1994).

Transition Grade Blends ("Transition Products")

In another embodiment hereof, a polyvinyl alcohol composition hereof can be a transition product produced in a continuous hydrolysis process. Such a transition product is in essence an intimate reactor blend of multiple polyvinyl alcohol grades as would be recognized by one of ordinary skill in the relevant art.

For example, in many commercial continuous polyvinyl alcohol hydrolysis processes, instead of completely stopping the process and cleaning the equipment, the polyvinyl acetate feed is transitioned and/or the reaction conditions are transitioned from grade to grade. At some point, the process, which has been producing one grade of specified properties, transitions over time to a second grade of specified properties by stopping production of the first product and starting production of the second. The production from this interim time period is referred to as a transition grade.

In one embodiment, this transition grade is produced by transitioning production of a polyvinyl alcohol copolymer to production of a polyvinyl alcohol homopolymer (or vice versa). In this case, the polyvinyl alcohol homopolymer is less soluble than the polyvinyl alcohol copolymer so that the dissolution rate of the particulate composition can be modified.

In another embodiment, the transition grade is produced by altering the hydrolysis conditions, for example, thermal treatment step and/or level of excess catalyst neutralization, which can result in different solubility polyvinyl alcohols from the same starting polyvinyl acetate.

In another embodiment, the transition grade is produced by transitioning both the starting polyvinyl acetate and the hydrolysis conditions (for example, thermal treatment step and/or level of excess catalyst neutralization).

While the exact composition of the transition grade varies as a function of time, when different polyvinyl starting materials are used the average composition typically falls within the blend proportions as described above.

Polymeric and Compositional Properties

The percent conversion of vinyl acetate to polyvinyl acetate can vary over a wide range. Though conversions ranging from 20% to 100% have been found satisfactory, commercially at least about a 30% conversion is preferable.

The viscosity-average degree of polymerization of polyvinyl acetate (and resulting polyvinyl alcohol) varies anywhere from about 200, or from about 300, or from about 400, or from about 500, or from about 700, to about 10000, or to about 3000, or to about 2000. The viscosity-average degree of polymerization of a polyvinyl alcohol copolymer is a value measured in accordance with JIS K6726 (1994), as described above.

Preferred amount of conversion of a polyvinyl acetate starting material is measured as a degree of hydrolysis. The polyvinyl alcohol resin should have a degree of hydrolysis of from about 60 mol %, or from about 65 mol %, or from about 70 mol %, or from about 75 mol %, or from about 85 mol %, or from about 88%, or from about 90 mol %, or from about 93 mol %, or from about 95 mol %, or from about 98 mol %, or from about 99 mol %, to 100 mol % (maximum). In one specific embodiment, the degree of hydrolysis is in the range of from about 60 mol % to 100 mol %. In another specific embodiment, the degree of hydrolysis is in the range of from about 65 mol % to about 90 mol %. The degree of hydrolysis can be measured in accordance with JIS K6726 (1994).

In one embodiment, the polyvinyl alcohol compositions hereof are substantially soluble in water and brine at a temperature of about 195° F. or higher.

In one embodiment, viscosity (based on a solution of 4 wt % in water (20° C., DIN 53015)) is in the range of from about 2 mPa·s, or from about 3 mPa·s, or from about 10 mPa·s, to about 125 mPa·s, or to about 70 mPa·s, or to about 40 mPa·s, or to about 30 mPa·s, or to about 15 mPa·s. The viscosity of all polyvinyl alcohol samples can also be determined on a 4% aqueous solution at 20° C. by the Hoeppler falling ball method (ASTM-D 1343-56).

Blends with Other Polyvinyl Alcohols

In addition to crystallinity modification of a polyvinyl alcohol polymer, another method for controlling the dissolution time of a particulate composition hereof is by blending a first polyvinyl alcohol, such as an acid-functional polyvinyl alcohol copolymer, with one or more second fully- or partially-hydrolyzed polyvinyl alcohols. Such other ("second") polyvinyl alcohols may be chosen to be more soluble than the first polyvinyl alcohol polymer, but typically they are chosen to be less soluble and thus extend the dissolution rate of the compositions comprising the combination.

In one embodiment, a polyvinyl alcohol composition hereof comprises a blend, wherein a first polymer, such as a homopolymer or an acid-functional polyvinyl alcohol copolymer, is present in the blend in an amount of from about 10 wt %, or from about 20 wt %, or from about 25 wt %, or from about 33 wt %, or from about 40 wt %, to about 90 wt %, or to about 80 wt %, or to about 77 wt %, or to about 67 wt %, or to about 60 wt %, based on the total weight of all polyvinyl alcohol components. In such embodiment, a second polymer is another polyvinyl alcohol that can, for example, be one or more partially- or fully-hydrolyzed polyvinyl alcohol homopolymers or copolymers. Such polyvinyl alcohol homopolymers are generally commercially available, for example under the brands KURARAY POVAL™ and ELVANOL™ from Kuraray Co., Ltd. (Tokyo, Japan) and its affiliates, and are present in the blend in an amount that makes up the balance of the composition wherein the content of the first and second, or all of three or more, polymers totals to 100 wt %.

In other embodiments, however, blends of polyvinyl alcohol polymers may involve, generally, combinations of one or more homopolymers, and/or one or more copolymers, and/or mixtures thereof; and the blend components need not be limited by any particular degree of hydrolysis, acid-functionality or other property.

Polyvinyl Alcohol Reaction Products

Also included in the polyvinyl alcohol composition to which this invention applies are compositions in which one or more —OH groups on a polymer chain has participated in a reaction to form a derivatized polymer. For example, the —OH groups can form inorganic esters such as when they react with boric acid, borates, lactates, sulfates, vanadyl compounds and/or substituted derivatives thereof, and mixtures of any two or more of the foregoing. Polyvinyl alcohol can also undergo Michaels addition with compounds containing activated double bonds, including for example acrylonitrile, acrylamide and vinyl aldehydes and ketones, including in each case substituted derivatives of, and mixtures of, the named reactants.

In other embodiments, the —OH group of a polyvinyl alcohol can form organic compounds such as the formation of an ester from a carboxylic acid or anhydride (e.g. acrylic or methacrylic acid, or maleic anhydride); the formation of a carbonate from a chloroformate; and the formation of a carbamate from a urea or isocyanate; including in each case substituted derivatives of, and mixtures of, the named reactants. Polyvinyl alcohol can also form an internal ether from the elimination of water, and can form an external ether from a reaction with a $C_2$ or higher, chloro-substituted carboxylic acid or ester thereof, including in each case substituted derivatives of, and mixtures of, the named reactants. Polyvinyl alcohols can also be crosslinked in a reaction with a multifunctional compound such as glyoxal, glutaraldehyde, urea-formaldehyde, melamine-formaldehyde, trimethylolmelamine sodium borate or boric acid, and isocyanates.

Polyvinyl Alcohol Production

A polyvinyl ester such as a polyvinyl acetate is converted to polyvinyl alcohol via hydrolysis, or alcoholysis, processes, as well known in the art. In such processes, the polyvinyl acetate is contacted with an alkali catalyst such as sodium hydroxide or sodium methylate. The major products of this reaction are polyvinyl alcohol and methyl acetate. Regardless of the hydrolysis process, the resulting polyvinyl alcohols will of course have substantially the same monomer makeup and degree of polymerization as the starting polyvinyl acetates.

Production of Polyvinyl Alcohol Granule Composition

In one embodiment of this invention, a polyvinyl alcohol for the polyvinyl alcohol granule composition can be prepared by a bulk, solution, suspension, dispersion or emulsion process. In such processes, a polyvinyl alcohol in a gel-like form, which is resistant to dissolving (or "sliming") in water, can be prepared by vigorously mixing alcoholic solutions of a polyvinyl ester and alkali in a mixing chamber such as a tank reactor. The polyvinyl alcohol product is removed from the reactor intact for further processing during which it continues to undergo gelation.

Generally in this type of process, polyvinyl acetate dissolved in methanol is treated with a strongly basic catalyst such as sodium methoxide, and methanolysis commences immediately forming vinyl alcohol units in the polymer and methyl acetate as a byproduct. In general, the alcoholysis reaction will be effected with the hydrolytic alcohol at temperatures ranging from about 20° C., or from about 40° C., to about 100° C., or to about 65° C., and the alcohol is most typically methanol, as noted, but can be other lower alkanols such as ethanol if desired. The pressure should, of course, be sufficient to maintain liquid-phase conditions at the desired temperature for the reaction, and pressures from atmospheric to two or more atmospheres of pressure or higher can be used. The hydrolytic alcohol should be substantially anhydrous, by which is meant that the alcohol will contain not more than about 1 percent, and preferably not more than about 0.2 percent water.

The alcohol content of the alcoholysis mixture should be such as to provide a suitable excess of the alcohol. Most generally, the alcohol used will be the alcohol employed for dissolving the ester in the production of the intermediate vinyl ester polymer which is to be alcoholyzed. It will generally constitute from about 40%, or about 50%, to about 90%, or to about 70%, of the weight of the alcoholysis reaction mixture. Conversely, the solids content will generally be from about 10%, or from about 30%, to about 60%, or to about 50%, of the reaction mixture. The by-product of the alcoholysis reaction will be methyl acetate. Such ester can be removed as formed during the alcoholysis or allowed to build up in the alcoholysis medium.

The alcoholysis catalyst can be any of the alkaline catalysts that are effective in catalyzing the alcoholysis such as the alkali metal hydroxides and the alkali metal alcoholates. The alcoholate catalysts, particularly sodium methylate, are especially preferred. The catalyst concentration in the alcoholysis mixture may range from about 0.05 wt %, or from about 0.1 wt %, to about 5 wt %, or to about 1 wt %, of the weight of the alcoholysis mixture.

Instead of a tank reactor as mentioned above, other types of reactors may also be used when preparing a reaction mixture that will be deposited in, on or onto a receptacle (as described below), including without limitation a line mixer, a kneader type mixer, a piston-flow type reactor, a tube-type reactors, and a tower type reactor. Examples of suitable tower type reactors include packed towers, perforated plate towers, and plate towers, such as bubble-cap towers. Alternatively, a heat-exchanging type reactor may be suitable for use herein, examples thereof including falling film evaporators, such as plate-fin type evaporators, wetted-wall towers, thin film evaporators, and shell and tube evaporators.

Regardless of the type of reaction device used, little to no change in the appearance of the solution is observed during the initial portion of this type of reaction. However, as the degree of alcoholysis approaches 40 to 50 percent, the viscosity begins to rise rapidly, and the solution gels. Heavy-duty mixing equipment would ordinarily be required to maintain good mixing, and then, as the alcoholysis proceeds further, to break down the gel into discrete particles. In this type of process, however, continuous processing of a so-called "plug flow" nature is employed such that all increments of the total mixture have essentially the same holdup time, or residence time, in the alcoholysis reaction zone because, as gelation ensues, the reaction mixture is spread out quickly as a film on a moving belt or rotating drum.

An important aspect of the mixing procedure thus involves the mixing time, which should be so correlated with the balance of the process that sufficient time will remain before the composition fully sets to a rigid gel that it is possible to recover the composition from the reactor and deposit it in the fluid state in or on a receptacle, such as on the surface of a moving belt, rotating drum or other carrier. Generally, the mixing operation can be carried out for from about 0.01 to about 0.1 of the total time required for the composition to fully set to a rigid gel for a mixer of the type used, where mixers that have less holdup require correspondingly less mixing and thus less mixing time. The quality of the product may be adversely affected if the gel remains in or on the receptacle overlong and becomes too firm, and an undesirable decrease in solubility in water may occur in the subsequent cutting step due to milling action. If the time allotted for gelation is too short, however, material is obtained that is not sufficiently gelled and that is not as strong or as water resistant, likely because the molecules are not properly oriented within the gel structure. Consequently appreciable amounts of gel may be lost in the washing step. Gel times of about 1 or more, or about 2 or more, or about 3 or more, and yet about 6 or fewer, or about 5 or fewer, or about 4 or fewer minutes, are frequently found to be suitable.

After completion of the mixing operation, the reaction mixture is recovered and deposited in such manner as will form a body in or on a receptacle, preferably the surface of a moving carrier such as a moving belt, but alternatively on a rotating drum. This step is performed by, for example, pumping the reaction mixture from the mixing chamber and coating it on the carrier, or by gravity flow of the mixture from the mixing chamber to the carrier. The preferred carrier may be a continuous, recessed moving belt, for example, a belt that is supported by a trough flared at both ends wherein the belt conforms to the contour of the trough. The result is that the mixture deposits in substantial thickness on the belt and as it is carried away from the outlet of the mixing chamber, and it gels in the shape of the receptacle (the trough) such that the deposit forms a body that corresponds substantially to the shape of the receptacle Alternately, the belt can be provided with a series of recesses, and provision can be made for ejection of the gel from the belt after gelation.

In one embodiment, the body undergoing gelation may be formed on a moving belt in the general form of a log or slab. In particular embodiments, such a log may have a cross section that is actually or approximately circular or elliptical in shape with the cross section having a longest dimension that is greater than about 6 inches, or greater than about 8 inches, or greater than about 10 inches, and yet is less than about 24 inches, or is less than about 18 inches, or is less than about 16 inches in length. Such a slab may have a cross section that is actually or approximately rectangular in shape and has a thickness (or smaller dimension) that is greater than about 4 inches, or greater than about 6 inches, or greater than about 8 inches, and yet is less than about 20 inches, or is less than about 18 inches, or is less than about 16 inches in length; and has a width (or larger dimension) that is greater than about 10 inches, or greater than about 20 inches, or greater than about 30 inches, and yet is less than about 60 inches, or is less than about 50 inches, or is less than about 40 inches in length. In other embodiments, the reaction mixture may be deposited on the belt in a form that initially provides a body having approximately a log shape wherein the body later transitions to a slab shape. In other embodiments, the body may have a shape that appears to be a combination of a log and a slab, such as the approximate shape of a banana. If desired, the body can be sized by passing it through rollers before granulation.

A suitable belt is canvas coated with polyvinyl alcohol followed by a layer of alcohol-resistant material such as cellulose ester or a resin, especially a vinyl chloride/vinyl acetate copolymer, and the body undergoing gelation rides on such belt as a continuous entity. Other materials from which a belt can be made include a polyamide, polyvinyl chloride, epoxy, silicone, polystyrene, polyurethane, or fluorine resin; or a chloropropylene, nitrile, or isoprene rubber.

In an alternative embodiment, the receptacle may be a rotating drum, and a body may be formed by depositing the reaction mixture thereon as a thick film. The reaction mixture is fed or pumped from the reacting vessel to a metering device such as a spreader box, which controls the flow of the reaction mixture through an adjustable opening, such as a T slit die, onto a rotating temperature-controlled drum. A film (or array or a ribbon) is formed on the drum as the cast gel mass sets and begins sol-gel transformation on making contact with the drum. The film (or ribbon) is then fed through series of guide rolls providing sufficient plug flow or holdup time, as described above, while the body undergoes gelation. In this embodiment, the body as a film (or a ribbon) may have a thickness that is greater than about 0.125 inch, or greater than about 0.25 inch, or greater than about 0.4 inch, and yet is less than about 1 inch, or is less than about 0.75 inch, or is less than about 0.6 inch. The drum and guide rolls may be rotated at a speed in the range of about 3 to about 5 rpms. Multiple such drum/guide roll assemblies may be employed to serve the polymerization reactor.

The reaction mixture deposited in, on or onto the receptacle or carrier forms a body undergoing gelation, and at the point before a significant amount of syneresis has taken place, the body is removed from the belt or drum, and is passed into a granulator, or other apparatus for cutting, comminuting or chopping the gel in any required manner. Gelation in this context is generally considered to be the conversion of molecules from a liquid solution to a rubber-like, semi-solid state characterized by a three-dimensional network, in which the stabilizing/driving forces are often hydrogen bonds, van der Waals interactions and/or chemical cross-linking involving the formation of covalent bonds between molecules. Links between polymer chains lead to progressively larger branched polymers resulting in the formation of a single macroscopic molecule, the gel network. When gelation occurs, the system loses fluidity, and a dilute or somewhat viscous polymer solution is converted into a system of infinite viscosity, i.e. the gel. The gel point is manifest by a dramatic increase in viscosity and the appearance of a nonzero elastic shear modulus. The resulting gel will no longer dissolve in the solvent, but can swell in it.

The point in time at which the body undergoing gelation is granulated is an important feature since if syneresis is allowed to proceed too far before granulation and the gel becomes appreciably harder thereby, the subsequent granulation operation may have a mechanical working effect the result of which is to raise the minimum solution temperature of the gel in water. Consequently, for maximum quality the body should be removed from the carrier or other receptacle before substantial syneresis has occurred. Conversely, if the body is granulated too soon, when the gel is sticky, the granules formed from the body will cohere in the granulator. Thus the optimum time for granulating the body is when the gel has undergone no more syneresis than needed to create a rubbery solid that is not sticky and can be granulated cleanly. Syneresis in this context is considered to be the extraction or expulsion of a liquid from a gel, such as when contraction of a gel causes liquid to be exuded at the surface or when the amount of diluent in a swollen polymer exceeds the solubility limit as the temperature changes. Following granulation, the resulting granules of the gel can be allowed to fully syneresis; the supernatant liquid, typically including alcohol and methyl acetate, being withdrawn and the granules of gel are washed until free of salt. Further discussion of processes in which PVOH is prepared in the form of a body undergoing gelation that is subjected to wet granulation, as discussed above, may be found in U.S. Pat. Nos. 2,642,419 and 2,643,994.

Figure 2:
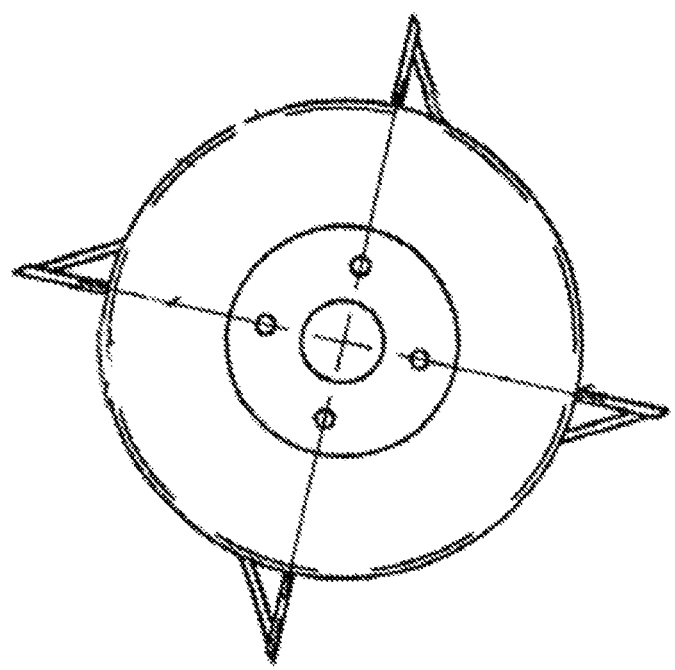
FIG. 2 is a cross-sectional view of a rotating spiral knife suitable for use in the processes of the invention.
Figure 3:
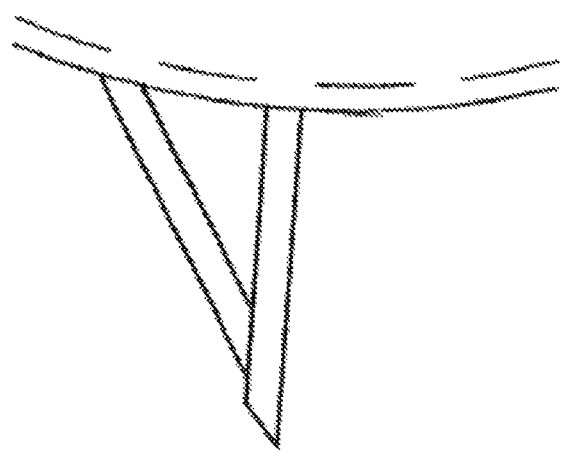
FIG. 3 is a detailed cross-sectional view of rotating spiral knife, suitable for use in the processes of the invention, that shows the construction for reinforcement of the knives.

For granulation of a body undergoing gelation, particularly when the body is being transported on a continuous belt, it is suitable to perform granulation using at least one rotating spiral knife, wherein the cutting edge is non-parallel to the axis of the knife and is mounted in a helical manner on a cylindrical shaped roller. Non-parallel in this context means a deviation of up to at least about 5°, or at least about 15°, or at least about 20° from the axis of the roller, as shown in FIG. 1. FIGS. 2 and 3 show greater detail of suitable knife blades. When the body undergoing gelation is being conveyed on a continuous belt, the polymer gel can be directed downward at the end of the belt and the rotating knife can cut the downward moving polymer gel. In another embodiment, the end of one knife in the rotating direction is the beginning of the next knife at the other lateral end of the polymer gel to be cut. That means that the next cut starts at the time when the previous cut ends. FIG. 1 shows an example of this embodiment. In such an embodiment, the difference of the speed of the continuous belt and the tip speed of the rotating knife is preferably less than about 25%, or less than about 10%, or less than about 5%.

In another embodiment, n spiral knifes are mounted on a cylinder, and each spiral knife forms a 1/n turn of the spiral wherein n is an integer i.e. 2, 3, 4, 5 and 6. Preferably n is 4 as shown in FIG. 1. The roll-like device on which the knife blades are mounted can be a cylinder, wherein the diameter of the cylinder including the knife can be greater than about 6 inches, or greater than about 8 inches, or greater than about 10 inches, and yet can be less than about 24 inches, or less than about 20 inches, or less than about 16 inches; and the diameter of the cylinder excluding the knife can be greater than about 4 inches, or greater than about 6 inches, or greater than about 8 inches, and yet can be less than about 18 inches, or less than about 14 inches, or less than about 10 inches.

The cutting knives shown in FIGS. 1-3 are but one possible embodiment of a granulator suitable for forming granules herein from a body undergoing gelation. Other suitable granulators are known in the art and could be used for such purpose with equal effect in the processes hereof.

As discussed above, granulating a body undergoing gelation that is formed from a polyvinyl alcohol (co)polymer, or blend thereof with other polymers, provides PVOH granules that are relatively compact and regular in shape. Using a knife such as described above or other suitable cutting device, the body may be granulated wherein the granulator can be adjusted to provide a batch of granules at least about 90 wt %, or at least about 95 wt %, or at least about 98 wt %, or at least about 99 wt % of which have a size that is 35 mesh or larger, or 25 mesh or larger, or 18 mesh or larger, or 14 mesh or larger.

In other embodiments, the granulator can be adjusted to provide a batch of granules at least about 90 wt %, or at least about 95 wt %, or at least about 98 wt %, or at least about 99 wt % of which have a size and shape wherein such granules fit within the volume defined by a right cuboid (a rectangular cuboid) having a length that is at least about 2 mm or more, or at least about 3 mm or more, or at least about 4 mm or more, and yet is about 10 mm or less, or about 8 mm or less, or about 6 mm or less; a width that is at least about 1 mm or more, or at least about 2 mm or more, or at least about 3 mm or more, and yet is about 8 mm or less, or about 7 mm or less, or about 6 mm or less; and a height that is at least about 0.5 mm or more, or at least about 0.75 mm or more, or at least about 1 mm or more, and yet is about 2 mm or less, or about 1.5 mm or less, or about 1.25 mm or less. A right cuboid (a rectangular cuboid) in this context is one in which each of the faces is a rectangle and so each pair of adjacent faces meets in a right angle. In the above description of dimensions, the cuboid is considered as being viewed from above where the length is the longest dimension, the height is the shortest dimension, and the value of the width is between the values of the other two dimensions. In the view of the cuboid from above, the length and width form a rectangle, and the height dimension is perpendicular to the plane of the rectangle formed by the length and width, and represents the depth or thickness of such rectangle.

If desired, the granules obtained by granulating a body undergoing gelation can be dried to reduce the content of a monohydric alcohol therein to less than about 5 wt %, or less than about 3 wt %, or less than about 2 wt %, or less than about 1 wt %, or less than about 0.5 wt %. For such purpose, contact dryers, shovel dryers, disk dryers and fluidized bed dryers are all suitable as apparatus in which thermal drying can be carried out. Suitable commercial brands of dryers include for example Bepex® dryers and Nara® dryers. Drying can also take place in the granulator itself, by heating the shell or blowing warm air into it. It is similarly possible to use a downstream dryer, for example a tray dryer, a rotary tube oven, a centrifuge, or a heatable screw. Preferred drying temperatures range from about 50° C. to about 250° C., or to about 200° C., or to about 150° C. The preferred residence time at such a temperature is less than about 30 minutes and more preferably less than about 10 minutes. However, drying will frequently leave at least a trace or negligible amount of monohydric alcohol in the polymer.

Preparation of Polyvinyl Alcohol Powder Composition

It is proposed herein to provide polyvinyl alcohol compositions that are composed of varying but controlled amounts of particles that are in the small, medium and large size ranges, and thus to obtain a particle size distribution that is relatively dense. For such purpose, it has been found desirable to mix together PVOH particles of differing types and sizes, and such result is obtained herein by mixing together (i) PVOH granules obtained as aforesaid by granulating a body undergoing gelation, and (ii) PVOH powders obtained either (a) by compacting and crushing PVOH fines or dust, or (b) partially crushing PVOH granules obtained from gelation. PVOH granules, and both types of PVOH powder (compacted fines and crushed granules), are thus all PVOH particles, but they are different types of PVOH particles since they do differ in size and shape. PVOH granules, for example, may be described as fitting within the volume of a cuboid, as set forth above, or as having a shape that is subrounded but with high sphericity, similar to squashed oblate spheroid. By contrast, PVOH powder as used herein typically has jagged edges, and may be described as having very angular roundness and low sphericity. However, none of the three types of PVOH particles used herein needs to differ chemically.

In other words, the PVOH granules and powder may be based on the same of different PVOH polymers.

One process for obtaining PVOH powder for mixing with PVOH granules is by compacting and sizing PVOH fines or dust obtained from a slurry alcoholysis process, such as disclosed in U.S. patent application Ser. Nos. 16/554,231, 16/554,126 and 16/554,078 (all filed 28 Aug. 2019).

In a slurry alcoholysis process, which is desirably a continuous process, polyvinyl alcohol is obtained from polyvinyl acetate and recovered as a slurry in a methanol and methyl acetate solvent system. The alcoholysis unit contains an agitation means so that the alcoholysis is at least partially conducted under agitation conditions. When the alcoholysis reaches about 40-50%, the polymer partially precipitates. The insoluble material takes the form of a gel of polymer molecules solvated with methanol. As the solubility decreases by further alcoholysis, the gel becomes tougher and begins to reject the associated solvent molecules. When the alcoholysis is completed, the polymer and solvent are mutually insoluble. If this gel is allowed to stand undisturbed, alcoholysis proceeds and the product is obtained in a massive, unworkable form. However, if the gel is worked mechanically (agitated) during this range above about 40% alcoholysis, the polymer will break down to finely-divided solids insoluble in the alcohol. The collapsing gel traps and sticks together with the fine particles from the previous alcoholysis cycle producing polyvinyl alcohol of a desired "popcorn ball" morphology. The slurry alcoholysis process is more fully described in U.S. Pat. No. 2,734,048.

In the slurry process as described above, extremely small PVOH particles (referred to herein as fines and/or dust) are produced in the polyvinyl alcohol composition during hydrolysis by the kneader mixer due to the pushing and shearing action from agitation caused by the kneader blades, and dust is also generated by mechanical attrition in pneumatic conveying and in the dryer cyclone. Thus, as one source of powder to be used herein, a polyvinyl alcohol as a slurry in a liquid solvent can be provided, the liquid can be removed from the PVOH output, and the dried output can be compacted and then crushed. In one embodiment of this invention, the material to be compacted can be the entire output of the slurry reactor, but in other embodiments, the output of the slurry reactor can first be classified by size on a sieve device, and the material to be compacted can be limited to only that portion of the slurry output that is smaller than 325 mesh, or smaller than 200 mesh, or smaller than 140 mesh. PVOH powder can of course also be provided as the output of PVOH processes other than the slurry process, and/or by compacting and/or crushing the output of those other processes when necessary.

Compaction of PVOH, or PVOH in a compositional mixture, can be carried out using conventional compaction methods and equipment, such as a double roll compactor, which places the component(s) to be compacted under extreme pressure. Where the blended component(s) adhere to themselves in the compaction process, no additional binder may be needed to agglomerate the mixture into a compacted object. In other words, the various polyvinyl alcohol components hereof may function as their own binder for the agglomerate. Alternatively, however, additives such as fillers, starches and plasticizers (described below) may be added to the composition as necessary to enhance the agglomeration of the component(s) thereof and/or adjust other properties thereof. Desirably such compaction and any ensuing pulverization, is a dry process that does not require an additional drying step.

Resin compaction can be carried out using conventional compaction methods and equipment, such as a double roll compactor. In a double roll compactor, the mixture is fed between two counter-rotating roll presses. Roll compactors with smooth rolls compact a powdered material into an object such as a sheet with consistent hardness. A roller style press combines torque, via a roll drive system, and thrust, via cylinders in a stressed frame, to agglomerate fines. Agglomeration involves a chemical process, in which two counter-rotating rolls press granular material into larger pieces by pulling or pushing fine material into the nip zone of a dual roll press whereupon the rolls pull the material through the roll nip, and produce dense output. The agglomerated materials put out by a double roll compactor typically form an object such as a sheet, ribbon or flakes, have a reduced surface area, and have an increased product bulk density. The rolls apply extreme pressure to press the mixture into a sheet- or ribbon-like form. The object formed by compaction can also be described, for example, as a block, chunk, hunk, lump, strand, cable, cylinder, briquette, or other type of three-dimensional shape, mass or workpiece. Desirably, the pressure applied during compaction is at least 5 T, or at least 10 T. After a certain pressure point, the compaction reaches an effective maximum where there is very little increase in density per unit of additional pressure. In one embodiment of the present invention, this effective maximum is about 30 T of pressure. "T" refers to ton (US)/square inch. Other types of specialized compactors that can be used for compaction of the compositions hereof can also include a briquetter or a single station press.

Once a composition hereof, or a portion of such composition, has been subjected to compaction, especially on a roll mill, the sheet output of the compaction process is passed to a crusher. Where compaction is performed by a roll mill, the crusher is often incorporated directly into the same piece of equipment as the roll mill. The crusher will crush or pulverize the compacted sheet to powder of a predetermined size range wherein such powder is random in shape but is desirably reasonably uniform in size and has a relatively narrow size distribution around the target. The crusher can be adjusted such that it produces powder at a selected, desired size range, such as any of the mesh size ranges set forth herein. A screening device can further sort the powder according to size, and send any that is smaller than a predetermined lower limit back to the compactor, and send any that is larger than a predetermined upper limit back to the crusher. In cases where it is possible to use a briquetter or single station press to make powder in a desired size range directly from compaction, it may not be necessary to further process the powder on a crusher.

The step of crushing a compacted sheet may be performed with a variety of equipment as known in the art and as suitable to a particular situation such as a bead mill, ball mill, jet mill, rod mill, hammer mill or pin mill. A hammer mill, for example, may have cutting blades with either a knife edge for a cleaner cut or a blunt edge for greater impact and breaking force.

Both PVOH granules and powder are thus provided by the various preparations as described above. There is, as a result of such preparations, made available in one embodiment hereof, a process for preparing a particulate polyvinyl alcohol composition, may thus be performed as follows (a) providing a polyvinyl alcohol in a liquid solvent in a reactor, (b) recovering the polyvinyl alcohol from the reactor in the form of a deposit in or on a receptacle wherein the deposit forms a body that is undergoing gelation and that corresponds substantially to the shape of the receptacle, (c) granulating the body to form polyvinyl alcohol granules, and (d) admixing with the polyvinyl alcohol granules with polyvinyl alcohol powder to form the composition, wherein the polyvinyl alcohol powder comprises (i) a selected amount of powder that is smaller than 80 mesh size and yet is 325 mesh size or larger, and/or (ii) a selected amount of powder that is 80 mesh size or larger.

In the above process, the weight of the polyvinyl alcohol powder may be at least about 2 percent, or at least about 3 percent, or at least about 5 percent, or at least about 10 percent, and yet is no more than about 20 percent, or no more than about 18 percent, or no more than about 15 percent, or no more than about 12 percent of the weight of the PVOH granules with which the powder is admixed. Also, in this embodiment of the process, the granules, the powder and/or the particulate composition formed from admixing the powder with the granules can each, two or all be dried, if desired, to reduce the content of a monohydric alcohol therein to less than about 5 wt %, or less than about 3 wt %, or less than about 2 wt %, or less than about 1 wt %, or less than about 0.5 wt %. Any of the drying apparatus discussed elsewhere herein can be used for such purpose.

Another embodiment of this invention, which results from the process described immediately above, is a particulate polyvinyl alcohol composition that includes (a) at least about 80 wt %, or at least about 90 wt %, or at least about 95 wt %, or at least about 98 wt %, or at least about 99 wt % (based on the total polyvinyl alcohol weight) of polyvinyl alcohol granules which have a size that is 35 mesh or larger, or is 25 mesh or larger, or is 18 mesh or larger, or is 14 mesh or larger; and (b) polyvinyl alcohol powder comprising (i) powder that is smaller than 80 mesh size and yet is 325 mesh size or larger, and/or (ii) powder that is 80 mesh size or larger. In this composition, the weight of the polyvinyl alcohol powder may be at least about 2 percent, or at least about 3 percent, or at least about 5 percent, or at least about 10 percent, and yet is no more than about 20 percent, or no more than about 18 percent, or no more than about 15 percent, or no more than about 12 percent, of the weight of the polyvinyl alcohol granules. Also in this composition, the content of a monohydric alcohol in the particles thereof may be less than about 5 wt %, or less than about 3 wt %, or less than about 2 wt %, or less than about 1 wt %, or less than about 0.5 wt %.

In another embodiment hereof, there is provided a particulate polyvinyl alcohol composition that at least about 80 wt %, or at least about 90 wt %, or at least about 95 wt %, or at least about 98 wt %, or at least about 99 wt % (based on the total polyvinyl alcohol weight) of polyvinyl alcohol granules (based on the total weight of polyvinyl alcohol) which have a size that is 35 mesh or larger, or is 25 mesh or larger, or is 18 mesh or larger, or is 14 mesh or larger. Also in this composition, the content of a monohydric alcohol in the particles thereof may be less than about 5 wt %, or less than about 3 wt %, or less than about 2 wt %, or less than about 1 wt %, or less than about 0.5 wt %; or the content of a monohydric alcohol therein may be 5 wt % or more, or be 4 wt % or more, or be 3 wt % or more; and yet be 10 wt % or less, or be 8 wt % or less, or be 6 wt % or less.

Another method useful herein for providing PVOH powder is to crush PVOH granules obtained as described above from the granulation of a PVOH body that is undergoing gelation. Such granules can be crushed using the same apparatus described above for crushing a compacted sheet, and crushing granules forms a mixture of uncrushed granules, and powder in the form of crushed granules. The mixture of crushed granules and uncrushed granules that is put out by the crusher forms a particulate composition, and the crusher can be adjusted such that at least about 80 wt %, or at least about 85 wt %, or at least about 90 wt %, or at least about 95 wt % of the particles provided in the mixture of crushed and uncrushed granules has a size that is 80 mesh or larger, or is 60 mesh or larger, or is 40 mesh or larger. Alternatively, PVOH granules, as provided herein, can be crushed in a separate step, and the powder formed thereby can then be mixed with uncrushed PVOH granules to form a composition as described above.

As a result, in another embodiment of this invention, a process hereof may be performed to prepare a particulate polyvinyl alcohol composition by providing a polyvinyl alcohol in a liquid solvent in a reactor, recovering the polyvinyl alcohol from the reactor in the form of a deposit in, on or onto a receptacle wherein the deposit forms a body that is undergoing gelation and that corresponds substantially to the shape of the receptacle, granulating the body to form polyvinyl alcohol granules at least about 90 wt %, or at least about 95 wt %, or at least about 98 wt %, or at least about 99 wt % of which have a size that is 35 mesh or larger, or is 25 mesh or larger, or is 18 mesh or larger, or is 14 mesh or larger, and crushing at least a portion of the polyvinyl alcohol granules to form the particles of the particulate polyvinyl alcohol composition; wherein the particles of the composition comprise a mixture of crushed granules and uncrushed granules, and wherein at least about 80 wt %, or at least about 85 wt %, or at least about 90 wt %, or at least about 95 wt % of the particles in the mixture of crushed and uncrushed granules have a size that is 80 mesh or larger, or is 60 mesh or larger, or is 40 mesh or larger.

When a composition is formed in the embodiment as described immediately above, the weight of the polyvinyl alcohol powder present as crushed granules can be at least about 2 percent, or at least about 3 percent, or at least about 5 percent, or at least about 10 percent, and yet is no more than about 20 percent, or is no more than about 18 percent, or is no more than about 15 percent, or is no more than about 12 percent, of the weight of the crushed and uncrushed polyvinyl alcohol granules.

Further, if needed, there may be added to the composition formed from the crushed and uncrushed granules supplemental polyvinyl alcohol powder that is smaller than 80 mesh size and yet is 325 mesh size or larger.

When a composition is formed in the embodiment as described immediately above, the weight of the supplemental polyvinyl alcohol powder from other sources can be at least about 2 percent, or at least about 3 percent, or at least about 5 percent, or at least about 10 percent, and yet is no more than about 20 percent, or is no more than about 18 percent, or is no more than about 15 percent, or is no more than about 12 percent, of the weight of the composition formed from the crushed and uncrushed polyvinyl alcohol granules plus supplemental powder.

Also, in these embodiments of the processes hereof, the granules, the powder and/or the particulate composition formed therefrom can each, two or all be dried, if desired, to reduce the content of a monohydric alcohol therein to less than about 5 wt %, or less than about 3 wt %, or less than about 2 wt %, or less than about 1 wt %, or less than about 0.5 wt %. Any of the drying apparatus discussed elsewhere herein can be used for such purpose.

From the processes described above, there is provided, in another embodiment hereof, a particulate polyvinyl alcohol composition containing a mixture of crushed polyvinyl alcohol granules and uncrushed polyvinyl alcohol granules, wherein at least about 90 wt %, or at least about 95 wt %, or at least about 98 wt, or at least about 99 wt % of the uncrushed granules have a size that is 35 mesh or larger, or is 25 mesh or larger, or is 18 mesh or larger, or is 14 mesh or larger; and wherein at least about 80 wt %, or at least about 85 wt %, or at least about 90 wt %, or at least about 95 wt % of the particles in the mixture of crushed granules and uncrushed granules have a size that is 80 mesh or larger, or is 60 mesh or larger, or is 40 mesh or larger.

In the above described composition, the weight of the polyvinyl alcohol powder that is present as crushed granules can be at least about 2 percent, or at least about 3 percent, or at least about 5 percent, or at least about 10 percent, and yet is no more than about 20 percent, or is no more than about 18 percent, or is no more than about 15 percent, or is no more than about 12 percent, of the weight of the composition formed from the crushed and uncrushed polyvinyl alcohol granules.

Further the composition described above may also contain supplemental polyvinyl alcohol powder that is smaller than 80 mesh size and yet is 325 mesh size or larger. The weight of the supplemental polyvinyl alcohol powder from other sources in the above composition can be at least about 2 percent, or at least about 3 percent, or at least about 5 percent, or at least about 10 percent, and yet is no more than about 20 percent, or is no more than about 18 percent, or is no more than about 15 percent, or is no more than about 12 percent, of the weight of the composition formed from the crushed and uncrushed polyvinyl alcohol granules plus the supplemental powder.

Also in any of the above compositions, the content of a monohydric alcohol therein may be less than about 5 wt %, or less than about 3 wt %, or less than about 2 wt %, or less than about 1 wt %, or less than about 0.5 wt %.

In other embodiments of the inventions hereof, any one or more of the above described polyvinyl alcohol particulate compositions can be used to make a polyvinyl alcohol reaction product such as a polyacetal such as polyvinyl butyral or polyvinyl formal. Processes for making a polyacetal from polyvinyl alcohol and an aldehyde or ketone are discussed elsewhere herein, and such reaction typically occurs in an aqueous reaction medium in which the reactants are contacted, and, when desired, the solvation effect of water can be enhanced by adding or substituting other solvents such as alcohol, toluene, dioxane, dimethylsulfoxide, dimethylformamide, or acetonitrile. The components can be added to or incorporated into the reaction mixture in essentially any order.

In other embodiments of the inventions hereof, any one or more of the above-described polyvinyl alcohol particulate compositions can be used to make a polyvinyl alcohol film or fiber. Methods for making a PVOH film or fiber are discussed elsewhere herein.

In any of the processes or methods disclosed herein for making from a polyvinyl alcohol a reaction product, or a film or fiber, the steps performed to make the reaction product, film or fiber can be performed on a PVOH particulate composition that is moved with a minimum of steps essentially directly from its production output to the reactor or fabrication equipment that will be used to make the reaction product, film or fiber. In an alternative embodiment, therefore, this PVOH particulate composition has not been dried or has not been extensively dried. In this and in other embodiments herein where the PVOH particulate composition has not been dried or has not been extensively dried, the content of a monohydric alcohol therein may thus be 5 wt % or more, or be 4 wt % or more, or be 3 wt % or more; and yet be 10 wt % or less, or be 8 wt % or less, or be 6 wt % or less. In embodiments such as these, containment systems are used to prevent offgassing of a monohydric alcohol to the atmosphere in any amount that would exceed applicable regulatory or safety standards.

However, in other embodiments of the processes or methods disclosed herein for making from a polyvinyl alcohol a reaction product, or a film or fiber, the steps performed to make the reaction product, film or fiber can be performed on a PVOH particulate composition that has been treated such that it meets applicable quality and regulatory standards for release and shipment. These alternative PVOH particulate compositions have thus been thoroughly dried, and the content therein of a monohydric alcohol may be less than about 5 wt %, or less than about 3 wt %, or less than about 2 wt %, or less than about 1 wt %, or less than about 0.5 wt %; although a trace or negligible amount may still be present.

As a result, in other embodiments of the inventions hereof, there is disclosed a process for preparing a polyvinyl alcohol reaction product by providing a polyvinyl alcohol in a liquid solvent in a reactor, recovering the polyvinyl alcohol from the reactor in the form of a deposit in or on a receptacle wherein the deposit forms a body that is undergoing gelation and that corresponds substantially to the shape of the receptacle, granulating the body to form polyvinyl alcohol granules wherein at least about 90 wt %, or at least about 95 wt %, or at least about 98 wt %, or at least about 99 wt % of the granules have a size that is 35 mesh or larger, or is 25 mesh or larger, or is 18 mesh or larger, or is 14 mesh or larger, and wherein the polyvinyl alcohol granules have a content of a monohydric alcohol that is 5 wt % or more, and contacting the polyvinyl alcohol granules with an aldehyde or a ketone in a solution to form a polyacetal. In still other embodiments, the aldehyde or ketone is selected from butyraldehyde and formaldehyde. Alternatively, the content of a monohydric alcohol therein may be 5 wt % or more, or is 4 wt % or more, or is 3 wt % or more; and yet is 10 wt % or less, or is 8 wt % or less, or is 6 wt % or less.

In yet other embodiments of the inventions hereof, there is disclosed there is disclosed a method for fabricating a film or fiber by providing a polyvinyl alcohol in a liquid solvent in a reactor, recovering the polyvinyl alcohol from the reactor in the form of a deposit in or on a receptacle wherein the deposit forms a body that is undergoing gelation and that corresponds substantially to the shape of the receptacle, granulating the body to form polyvinyl alcohol granules wherein at least about 90 wt %, or at least about 95 wt %, or at least about 98 wt %, or at least about 99 wt % of the granules have a size that is 35 mesh or larger, or is 25 mesh or larger, or is 18 mesh or larger, or is 14 mesh or larger, and wherein the polyvinyl alcohol granules have a content of a monohydric alcohol that is 5 wt % or more, forming a solution from the polyvinyl alcohol granules, and casting a film, or spinning a fiber, from the solution of polyvinyl alcohol granules. In still other embodiments, a film is cast from the solution; and in still other embodiments, a fiber is spun from the solution. Alternatively, the content of a monohydric alcohol therein may be 5 wt % or more, or is 4 wt % or more, or is 3 wt % or more; and yet is 10 wt % or less, or is 8 wt % or less, or is 6 wt % or less.

In yet other embodiments of the inventions hereof, there is disclosed a process for preparing a polyvinyl alcohol reaction product by forming a solution from polyvinyl alcohol granules, and contacting the solvated polyvinyl alcohol granules with an aldehyde or a ketone in the solution to form a polyacetal, wherein at least about 90 wt %, or at least about 95 wt %, or at least about 98 wt %, or at least about 99 wt % of the granules from which the solution is prepared have a size that is 35 mesh or larger, or is 25 mesh or larger, or is 18 mesh or larger, or is 14 mesh or larger, and wherein the polyvinyl alcohol granules from which the solution is prepared have a content of a monohydric alcohol that is less than 5 wt %. In still other embodiments, the aldehyde or ketone is selected from butyraldehyde and formaldehyde.

In yet other embodiments of the inventions hereof, there is disclosed a method for fabricating a film or fiber by forming a solution from polyvinyl alcohol granules, and casting a film, or spinning a fiber, from the solution of polyvinyl alcohol granules; wherein at least about 90 wt %, or at least about 95 wt %, or at least about 98 wt %, or at least about 99 wt % of the granules from which the solution is prepared have a size that is 35 mesh or larger, or is 25 mesh or larger, or is 18 mesh or larger, or is 14 mesh or larger, and wherein the polyvinyl alcohol granules from which the solution is prepared have a content of a monohydric alcohol that is less than 5 wt %. In still other embodiments, a film is cast from the solution; and in still other embodiments, a fiber is spun from the solution.

In yet other embodiments of the inventions hereof, there is disclosed a method of reducing the loss of one or more desired fluids from a subsurface formation, or from the confines of a wellbore installed within such formation, comprising applying a particulate vinyl alcohol composition to a wall of the formation that is accessible from the wellbore; wherein the composition is prepared from polyvinyl alcohol granules at least about 90 wt %, or at least about 95 wt %, or at least about 98 wt %, or at least about 99 wt % of which have a size that is 35 mesh or larger, or is 25 mesh or larger, or is 18 mesh or larger, or is 14 mesh or larger; and wherein the polyvinyl alcohol granules from which the composition is prepared have a content of a monohydric alcohol that is less than 5 wt %.

When it is desired to prepare compositions herein by mixing PVOH granules with PVOH powder, the granules as described above can be provided by selecting the appropriate setting on the granulator to provide the desired size of granule. The PVOH powder to be mixed with granules in such a composition can be provided, as described above, by compacting PVOH dust to form a slab and then crushing the slab. To be able to provide an inventory of powders of different sizes to be used in desired amounts for admixture with granules to form compositions, powder can be classified according to size to permit collection of suitable amounts of various sizes to serve as stock for supplying the powder component in such mixtures. Size classification, or grading or sorting a batch of powder particles according to size, is often performed on a mechanical shaker having the ability to obtain separation using sieves. A typical sieve separator involves a nested column of sieves, each sieve being formed from wire mesh cloth or screen. The sieve in the top pan has the largest mesh openings, and each succeeding pan below has progressively smaller size mesh openings such that each lower sieve in the column receives particles that were not retained on the larger mesh openings of the sieve immediately above it. At the base is a round pan with no openings, called the receiver, which collects all particles that were too small to be retained on any of the sieve screens above.

The sieve openings, or mesh sizes, of the various screen-bottomed pans are selected to be the same as the various sizes of particles desired for use in preparing compositions, and each pan of such selected size will retain powder particles that are large enough that they do not fall through.

The column is vibrated by a mechanical shaker, usually for a fixed amount of time, and the shaking action gives the particles in the batch of powder that was originally placed on the top screen enough motion to either be retained on a screen or fall through to the bottom collector pan. Those that do not fall through form the supply of particles of the selected sizes to be used as mixing components. The particles retained on each pan are removed and stored, and later serve as the inventory for supplying particles in admixture with granules, where the mixture can be prepared based on a formulation that calls for particular amounts of powdered particles that have a particular size classification. The amounts needed of each size needed are withdrawn from inventory and added to the mixture being formed. This approach provides great flexibility when determining what relative amounts of powdered particles of what size it is desired to add to a composition being formed.

In an alternative embodiment of any of the processes set forth above, there may be further provided a step of contacting the polyvinyl alcohol particles of the composition with a plasticizer prior to sorting the particles according to size.

The different compositions disclosed herein, or formed by the processes disclosed herein, may in various embodiments that are alternatives to, or alternative aspects of, particle size characterizations set forth elsewhere herein, have a particle size distribution described by one or more of the following size ranges:

A composition wherein at least about 97.5 wt %, or at least about 99 wt %, or at least about 99.5 wt %, of the polyinyl alcohol particles have a particle size of 325 mesh or larger, and smaller than 3 mesh.

A composition wherein at least about 96 wt %, at least about 98 wt %, or at least about 98.5 wt %, of the polyinyl alcohol particles have a particle size of 200 mesh or larger, and smaller than 3 mesh.

A composition wherein at least about 95 wt %, or at least about 97 wt %, or at least about 98 wt %, of the polyinyl alcohol particles have a particle size of 140 mesh or larger, and smaller than 3 mesh.

A composition wherein at least about 85 wt %, or at least about 90 wt %, or at least about 95 wt %, of the polyinyl alcohol particles have a particle size of 80 mesh or larger, and smaller than 3 mesh.

A composition wherein at least about 80 wt %, or at least about 85 wt %, or at least about 90 wt %, of the polyinyl alcohol particles have a particle size of 50 mesh or larger, and smaller than 3 mesh.

A composition wherein at least about 75 wt %, or at least about 80 wt %, or at least about 85 wt %, of the polyinyl alcohol particles have a particle size of 35 mesh or larger, and smaller than 3 mesh.

A composition wherein at least about 65 wt %, or at least about 70 wt %, or at least about 75 wt %, of the polyinyl alcohol particles have a particle size of 20 mesh or larger, and smaller than 3 mesh.

A composition wherein at least about 55 wt %, or at least about 60 wt %, or at least about 65 wt %, of the polyinyl alcohol particles have a particle size of 12 mesh or larger, and smaller than 3 mesh.

In yet another embodiment of a composition hereof, the particle size distribution of the particles of the composition may be described by a set of values falling within the stated content ranges for a combination of two or more of the mesh screen sizes listed above.

In another embodiment, a composition of this invention may have a content of free dust or ultrafines of polyvinyl alcohol polymer in an amount of less than about 3 wt %, or less than about 2.5 wt %, or less than about 2 wt %, or less than about 1.5 wt %, or less than about 1 wt %, based on the total weight of polyvinyl alcohol. Content of free dust or fines may be determined quantitatively as the weight percent of free dust or fines of a sample of polyvinyl alcohol that could be eluted from the sample with $4.7 \times 10^{-4}$ m$^3$/s (1.0 cfm) of air in 5 minutes using an open "ACE" B (70~100 micron) porosity fritted funnel as the sample receptacle. The process for determining the content of free dust or fines in a sample is more fully described in U.S. Pat. No. 4,389,506.

In any of the methods as described above, the type and amount of particles to be added is desirably determined in a manner to balance the content of the other size fractions in the composition to give a composition that has a negligible amount of dust but that does not have a disproportionate amount of large particles either, as dictated by the needs of the intended use of the composition. Thus a composition having a relatively dense particle size distribution or gradation may be provided in which most of the particles are in the medium to large size ranges but there are still enough small particles to fill the voids between the larger particles.

Additives

A composition of this invention may also optionally include one or more additives, which additives may include, for example, fillers (such as acid-soluble weighting agents), plasticizers, starches, slip additives, antioxidants, pigments, dyes, as well as mixtures thereof.

Certain of these additives can be present as part of the polyvinyl alcohol granule composition, certain can be part of the polyvinyl alcohol powder composition, and certain can be added separately.

For example, fillers may be blended with the resin component to enhance mechanical properties and regulate the solubility curves of the compositions of this invention. The total amount of filler added can vary widely depending on the desired property modification, for example, up to about 50 wt %, or up to about 30 wt %, or up to about 5 wt %, based on the total weight of the compositions.

In many instances where a composition hereof is being used for downhole treatments, it is desirable to have the specific gravity of the composition be close to that of a carrier fluid in order to allow for pumping and satisfactory placement of a diverting agent or loss circulation control compositions using the selected carrier fluid. A weighting agent can be used for such purpose.

When used, an acid-soluble weighting agent filler can be blended with the resin prior to compaction. Weighting agent generally refers to any additive used to increase the density of the resin component. Acid-soluble weighting agents generally include substances such as natural minerals and inorganic and organic salts. For example, the weighting agent can comprise a metal ion selected from the group consisting of calcium, magnesium, silica, barium, copper, zinc, manganese and mixtures thereof, and a counterion is selected from the group consisting of fluoride, chloride, bromide, carbonate, hydroxide, formate, acetate, nitrate, sulfate, phosphate and mixtures thereof.

In another embodiment, the filler added is an acid-soluble weighting agent, which generally include substances such as natural minerals and inorganic and organic salts. Specific examples of such fillers include minerals such as $CaCO_3$, $CaCl_2$ and $ZnO$.

In yet another embodiment, this invention provides a composition suitable for use in downhole treatments that includes a blend of a polyvinyl alcohol resin component and an acid-soluble weighting agent with a starch. Such blend can typically comprise from about 10 to about 90 parts by weight of the polyvinyl alcohol resin component and from about 90 to about 10 parts by weight of a starch, based on 100 parts by weight of the combination of polyvinyl alcohol resin component and starch. Preferably, however, there should be at least about 30 parts by weight polyvinyl alcohol resin component in any starch blend. Suitable starches for use in the present invention include natural starches, synthetic starches, physically modified starches, chemically modified starches and mixtures thereof.

Plasticizers may be included in manufacturing of the compositions of this invention to improve the flow characteristics of the polyvinyl alcohol. In order to obtain a uniform plasticizer coating it is preferred to utilize a spray mechanism to coat the particles of the polyvinyl alcohol component(s) of the composition. A secondary effect of such plasticizers is to reduce any dusting issues with the polyvinyl alcohol compositions prepared therefrom.

Materials commonly used as plasticizers for polyvinyl alcohols are generally known to those of ordinary skill in the relevant art, and are generally commercially available. Suitable plasticizers include, for example, compounds such as water, glycerol, polyglycerol, ethylene glycol, polyethylene glycols, ethanol acetamide, ethanol formamide, and acetates of triethanolamine, glycerin, trimethylolpropane and neopentyl glycol, and mixtures of two or more of the above. The preferred polyglycol used as an anti-dusting agent in this invention is polyethylene glycol having a molecular weight ($M_n$) of about 200 and 600 due to its superior dust suppressant properties after extreme temperature recycling.

Plasticizers that are solid or crystalline at ambient temperatures, such as trimethylolpropane, may be dissolved in water, or another liquid medium that will not offset the plasticization effect, for use as a sprayable plasticizer. Alternatively, however, a plasticizer can be mixed with the polyvinyl alcohol component(s) of a composition hereof when both are dissolved or dispersed in a liquid, or when both are in dry form. When a plasticizer is mixed with polyvinyl alcohol(s) in liquid, the resulting mixture will have to be dried to form a particle containing plasticized polyvinyl alcohol before other steps are taken, such as compaction of the dried mixture. When a polyvinyl alcohol composition containing a plasticizer is compacted, the plasticizer can be added to the composition before or after the compacting step. When a polyvinyl alcohol composition containing a plasticizer is compacted and the plasticizer is added to the composition after compaction into an object, and after granulation of the object, the plasticizer can be added before or after the step of granulation.

Typically the amount of plasticizer used can vary up to about 40 wt %, or up to about 30 wt %, or up to about 20 wt %, based on the weight of the polyvinyl alcohol component(s). In other embodiments, the amount of plasticizer used in the composition can be in the range of about 0.5 wt % to about 15 wt %, 0.5 wt % to about 10 wt %, 0.5 wt % to about 6 wt %, or about 1 wt % to about 4 wt %, based on the total weight of the composition.

In one embodiment, a composition that yields a combination of good solubility properties and density comprises: (a) from about 60 wt % to about 94 wt % polyvinyl alcohol resin component; (b) from about 5 wt % to about 40 wt % acid-soluble weighting agent; and (c) from about 1 wt % to about 15 wt % plasticizer, based on the combined weight of (a), (b) and (c).

One or more additives in addition to those named can be incorporated into the compositions as necessary when they are used for downhole treatments. These optional additives include without limitation chelators, anti-oxidants, pH-adjusting agents, oxidizing agents, other lost circulation materials (such as described in the previously incorporated references), scale inhibitors, corrosion inhibitors, clay control additives, iron control additives, reducers, oxygen scavengers and the like.

Uses of the Compositions

The compositions hereof can be used to make fibers. Fibers can be made from polyvinyl alcohol by a variety of methods, and the method is appropriately selected in view of the required dimensions, uses and objects of the fiber. In one example of such a method, a fiber can be prepared from highly concentrated polyvinyl alcohol, which is extruded through very small holes in a spinning jet into a medium effective to cause rapid congealing or solidification of the extruded PVOH concentrate in a semi-melt type spinning operation. The resulting solidified concentrated polyvinyl alcohol is then dried to remove water associated with the polyvinyl alcohol during spinning. During drying of the polyvinyl alcohol, elongation or stretching is suppressed while the polyvinyl alcohol contains substantial quantities of water. After drying, the resulting polyvinyl alcohol filaments are heated to elevated temperatures and stretched rapidly and uniformly to a length many times their original length. Subsequently, these stretched filaments are subjected to further treatment at elevated temperatures during which slight shrinkage takes place. After washing and treatment with a finishing agent, and then drying, filaments are obtained that are substantially circular in cross-sectional configuration, that have no distinct skin and core sections, and that have good performance in properties such as dyeability, strength, wet heat resistance, and fatigue resistance.

In another example of a method to make a fiber, a laboratory-scale spinning apparatus is employed that comprises a reservoir for the spinning solution, which feeds two positive displacement metering pumps and which are so interconnected and are run by variable speed motor so as to permit the accurate metering of as little as from about 3 to about 10 cc per minute of the spinning solution. This apparatus extrudes a uniform filament of spinning solution through the spinnerette orifice, and a candle filter, using muslin as the filtering medium, permits the spinnerette to be raised from and lowered into the coagulating bath without interfering with the flow of spinning solution. The filter minimizes the incidence of clogging of the spinnerette orifice. The spinnerette is attached to the filter through a glass tube. The coagulating bath is contained in a stainless-steel tray, 24 inches long, with an effective fiber immersion length of 18 inches. Single-stretching of the fiber is effected by wrapping the fiber once around a step on a step cone, then to a rewind spool. The diameters of the steps are calculated to permit any elongation from 0 to 1000% in 50% increments. Sequential stretching is effected by two-step cones mounted parallel and rotating at the same speed. The fiber is fed around the two smallest diameter steps, then around successive larger steps and is finally wound on a rewind spool. The diameters of the steps vary from ½ inch to 4 inches and ⅛-inch increments, permitting up to 700% stretch by this method. In particular, a fiber that is insoluble in boiling water is obtained from an ethylene diamine solution containing 24% steroregular polyvinyl alcohol having a reduced viscosity of about 0.4 that is extruded through a spinnerette as described above at a rate of 1.5 feet per minute into a coagulating bath of absolute methanol. The coagulation time is 60 seconds, and the fiber is subjected to a total stretch or elongation of 450% and then dried at 130°

C. for a period of 16 hours in order to remove all of the ethylene diamine. Methods for making PVOH fibers are further discussed in the art, for example in references such as U.S. Pat. Nos. 2,610,360, 2,906,594, 3,063,787, 3,066,999, 3,102,775, 3,850,901 and 4,713,290.

The compositions hereof can also be used to make films. Films can be made from polyvinyl alcohol by a variety of methods, and the method is appropriately selected in view of the required thickness, uses and objects of the film. Generally mentioned are film formation from polymer solution by a dry process which comprises extruding into air or an inert gas such as nitrogen, a casting film formation method, wet film formation method (discharging into a poor solvent), gel film formation method (a PVOH aqueous solution is once cooled and gelled, then, solvent is removed by extraction to obtain a PVOH film), and a combination method thereof, in addition to use of a film formation method by a melt extrusion method using a water-containing PVOH. In one example of preparing a film by melt extrusion, a dried composition was charged into a melt extruder provided with a screw 15 mm in diameter and a cylinder 300 mm long (L/D=20). The melt extruder was operated with the cylinder heated to temperatures ranging from 210 to 230° C., and the die to 215° C. The melted composition was air inflated into a cylindrical film about 100 mm in diameter by passing through a die having an annular opening 25 mm in inner diameter and 0.3 mm wide. The resultant product was a colorless, transparent and tough film 0.05 mm thick, and having a nature of being insoluble in water at a temperature below 40° C. and readily soluble in water at 80° C. Methods for making PVOH films are further discussed in the art, for example in references such as U.S. Pat. Nos. 3,607,812, 5,187,961 and EP1153961A1.

The compositions hereof can also be used in fluid injection operations for treatment of subsurface wells and wellbores by processes as generally known in the art, and as exemplified in references such as U.S. Pat. Nos. 3,724,549, 4,665,986, WO2006/088603A1, U.S. Pat. Nos. 5,105,885, 5,207,831, US2006/0041060A1, EP0587383A1 and U.S. patent application Ser. Nos. 16/554,078, 16/554,231, 16/554,177 and 16/554,126 (all filed 28 Aug. 2019). These compositions are particularly suitable for use in subterranean formations where formation temperatures are typically about 200° F. or lower, although in other cases these compositions can also have suitable stability for sufficient time periods at temperatures of up to about 250° F. When a composition hereof is being used for a downhole treatment, the particle size distribution sought to be obtained from the processes and methods of this invention can vary widely depending on the permeability of the substrate, the nature of the carrier fluid, the subsurface temperature profile, the particular polyvinyl alcohol composition being used, and other factors recognized by those of ordinary skill in the relevant art.

This invention therefore further provides a method of reducing the loss of one or more desired fluids from a subsurface formation, or from the confines of a wellbore installed within such formation, comprising treating a wall of the formation accessible from the wellbore with a composition according to this invention. Performing such a method typically involves applying the composition to the wall of the formation to temporarily or permanently seal an opening therein In other embodiments, the compositions hereof can be used to prepare acetals such as polyvinyl butyral, which find substantial use as an interlayer in glazing or glass laminates, or in a photovoltaic assembly.

Commercially, the most important reaction of the —OH groups of a polyvinyl alcohol is intramolecular (cyclic) or intermolecular (crosslinking) acetalization based on reaction with an aldehyde or ketone. Polyvinyl butyral and polyvinyl formal, for example, are produced in commercial quantities from the reaction of polyvinyl alcohol and butyraldehyde and formaldehyde, respectively, usually in an aqueous reaction mixture and often with an acid catalyst (such as a strong mineral acid) and an emulsifying agent (such as sodium dodecylbenzenesulfonate and/or lauryl sulfate). Details of processes for making polyvinyl butyral are further discussed in references such as U.S. Pat. No. 1,725,362, U.S. RE20430, U.S. Pat. No. 4,533,679 or 9,012,570.

An alternative embodiment of this invention is consequently a process for the production of a polyacetal that includes providing a particulate polyvinyl alcohol composition as described herein, and reacting the polyvinyl alcohol composition with an aldehyde or a ketone, such as an aldehyde $R^2$—C(O)H or a ketone $R^3$—C(O)—$R^4$, wherein $R^2$, $R^3$ and $R^4$ are independently selected from the group consisting of:

(a) a —$CH_3$, a —$C_2H_5$, or a $C_3$ to $C_{25}$ straight-chain, branched or cyclic alkane or alkene moiety, optionally substituted with at least one member selected from the group consisting of Br, F, I, —OH, —$NH_2$ and —SH;

(b) a —$CH_3$, a —$C_2H_5$, or a $C_3$ to $C_{25}$ straight-chain, branched or cyclic alkane or alkene moiety comprising one to three heteroatoms selected from the group consisting of O, N, Si and S, and optionally substituted with at least one member selected from the group consisting of Cl, Br, F, I, —OH, —$NH_2$ and —SH;

(c) a $C_6$ to $C_{20}$ unsubstituted aryl moiety, or a $C_6$ to $C_{25}$ unsubstituted heteroaryl moiety having one to three heteroatoms independently selected from the group consisting of O, N, Si and S;

(d) a $C_6$ to $C_{25}$ substituted aryl moiety, or a $C_6$ to $C_{25}$ substituted heteroaryl moiety having one to three heteroatoms independently selected from the group consisting of O, N, Si and S; and wherein said substituted aryl or substituted heteroaryl has one to three substituents independently selected from the group consisting of:

(i) a —$CH_3$, a —$C_2H_5$, or a $C_3$ to $C_{25}$ straight-chain, branched or cyclic alkane or alkene moiety, optionally substituted with at least one member selected from the group consisting of Cl, Br, F, I, —OH, —$NH_2$ and —SH, (ii) —OH, (iii) —$NH_2$, and (iv) —SH; and (e) a —$(CH_2)_n Si(CH_2)_m CH_3$, a —$(CH_2)_n Si(CH_3)_3$, or a —$(CH_2)_n OSi(CH_3)_m$, moiety where n is independently 1-4 and m is independently 0-4.

In yet another embodiment of the above process, the aldehyde is selected from butyraldehyde and formaldehyde.

In yet another embodiment, this invention provides a polyvinyl butyral prepared from a particulate polyvinyl alcohol composition as described herein. In yet another embodiment, this invention provides a multi-layer laminate comprising an interior layer prepared from the above-described polyvinyl butyral. In yet another embodiment, the multi-layer laminate comprises a transparent glass device or a photovoltaic module, which is a component of an array that generates electricity from solar radiation.

EXAMPLES

The following examples will facilitate a more complete understanding of this invention, but it is understood that the invention is not limited to the specific embodiments presented below.

Examples 1, 2 and 3 below present a more complete understanding of this invention by describing solubility curves for three different batches of PVOH granules obtained by the processes hereof: a first batch having a relatively high rate of solubility (Example 1), a second batch having an intermediate rate of solubility (Example 2), and a third batch having a low rate of solubility (Example 3).

The particle size distribution can be shifted towards smaller particle size distribution as necessary by adding preferably 10 about wt % or less, or about 5 wt % or less, of fine particles having an average diameter of 74 urn or less (200 mesh-pass).

On the other hand, the particle size distribution can be shifted to larger particles size by adding preferably about 10 wt % or less, or about 5 wt % or less, of larger particles having an average diameter of 4760 to 6730 urn (3 to 4 mesh-pass) that are produced by compaction of the fine particle size powder.

Example 1

30 grams of a 98% partially-saponified polyvinyl alcohol having 4% viscosity of 33 cps and 470 grams of deionized water were added into a vessel equipped with an agitator. The vessel was then placed in a water bath. The water bath heat controller was set at the desired temperature (122° F. or 149° F.). The agitator speed inside the vessel was set at 20 RPM. The timer was started as soon as the temperature inside of the vessel reached the desired temperature (122° F. or 149° F.). 10 mL of sample in the vessel was then collected in a centrifuge tube at the following times: 15, 30, 60, 120, 180, 240, 300, 360 and 420 minutes. The 10 mL sample was placed in centrifuge for 10 minutes at 1,500 RPM. The supernatant liquid was filtered through a 200 mesh sieve screen and placed into a pre-weighed aluminum pan. The sample together with the aluminum pan was then placed in an oven set to 105° C. and left overnight to dry. The pan and contents were weighed and the percent water solubles was calculated using the following equation:

% Water Solubles=(Weight of Residue plus pan–Weight of pan)*100/(Weight of sample)

Table 1 shows that after six hours at 149° F. the solubility of Example 1 was over 85%, while after 6 hours at 195° F. the dissolution was 100%.

TABLE 1

Solubility in DI Water: 30-98 type Polyvinyl Alcohol Granules

| Example 1 | Time (min) | Dissolution (wt %) @ 149° F. | Example 1 | Time (min) | Dissolution (wt %) @ 195° F. |
|---|---|---|---|---|---|
| | 0 | 0 | | 0 | 0 |
| | 15 | 64.44 | | 15 | 96.76 |
| | 30 | 64.69 | | 30 | 97.77 |
| | 60 | 73.04 | | 60 | 97.82 |
| | 120 | 80.55 | | 120 | 99.32 |
| | 180 | 84.03 | | 180 | 100 |
| | 240 | 85.55 | | 240 | 100 |
| | 300 | 86.16 | | 300 | 100 |
| | 360 | 86.15 | | 360 | 100 |
| | 420 | 86.55 | | 420 | 100 |

Example 2

30 grams of the Example 2 material and 470 grams of deionized water were added into a vessel equipped with an agitator. The Example 2 material is 88% partially hydrolyzed uncrushed polyvinyl alcohol with 4% viscosity of 49 cps.

The solubility test discussed in Example 1 above was used to determine the rate of disintegration of the of the Example 2 material. Table 2 shows that after six hours at 149° F., Example 2 was less than 44% dissolved while after 6 hours at 195° F. the dissolution was 99%.

TABLE 2

Solubility in DI Water: 49-88 type Polyvinyl Alcohol Granules

| Example 2 | Time (min) | Dissolution (wt %) @ 149° F. | Time (min) | Dissolution (wt %) @ 195° F. |
|---|---|---|---|---|
| | 0 | 0 | 0 | 0 |
| | 15 | 19.45 | 15 | 21.39 |
| | 30 | 20.84 | 30 | 32.62 |
| | 60 | 25.50 | 60 | 90.62 |
| | 120 | 29.10 | 120 | 96.55 |
| | 180 | 35.05 | 180 | 98.42 |
| | 240 | 39.42 | 240 | 98.56 |
| | 300 | 41.98 | 300 | 98.21 |
| | 360 | 44.81 | 360 | 99.00 |

Example 3

30 grams of the polymer and 470 grams of deionized water were placed in a vessel equipped with an agitator. The Example 3 material is composed of hydrophobically modified polyvinyl alcohol that is 88% hydrolyzed, and the 4% viscosity of polymer was 28.

The solubility test discussed in Example 1 above was used to determine the rate of disintegration of the Example 3 material. In six hours at 149° F. the solubility of the Example 3 material was less than 20% while after 1955° F. the dissolution was 100%.

The invention claimed is:

1. A process for preparing a particulate polyvinyl alcohol composition, comprising the steps of:
   (1) providing a polyvinyl alcohol in a liquid solvent in a reactor,
   (2) recovering the polyvinyl alcohol from the reactor in the form of a deposit in, on or onto a receptacle wherein the deposit undergoes gelation to form a body that corresponds substantially to the shape of the receptacle,
   (3) granulating the body to form a polyvinyl alcohol granule composition comprising at least about 90 wt % polyvinyl alcohol granules (based on the total weight of the polyvinyl alcohol granule composition composition),
   (4a) admixing the polyvinyl alcohol granule composition with from about 0.5 wt % to about 20 wt % (based on the total weight of the particulate polyvinyl alcohol composition) of a polyvinyl alcohol powder composition to form the particulate polyvinyl alcohol composition, wherein the polyvinyl alcohol powder composition comprises (i) a polyvinyl alcohol powder that is smaller than 80 mesh size and is 325 mesh size or larger, or (ii) a polyvinyl alcohol powder that is 80 mesh size or larger and smaller than 35 mesh size, or (iii) a combination of (i) and (ii); or (4b) crushing the polyvinyl alcohol granule composition to form the particulate polyvinyl alcohol composition, wherein at least about 80 wt % of the particles in the particulate polyvinyl alcohol composition have a size that is 80 mesh or larger and smaller than 3 mesh, based on the total weight of the particulate polyvinyl alcohol composition, and wherein the particulate polyvinyl alcohol composition comprises:
(a) from about 70 wt % to about 99.5 wt % of polyvinyl alcohol granules,
(b) from about 0.5 wt % to about 20 wt % of (i) a polyvinyl alcohol powder that is smaller than 80 mesh size and is 325 mesh size or larger, or (ii) a polyvinyl alcohol powder that is 80 mesh size or larger and smaller than 35 mesh size, or (iii) a combination of (i) and (ii), and
(c) less than about 10 wt % combined of polyvinyl alcohol bigs and polyvinyl alcohol ultrafines, wherein wt % is based on the total weight of the particulate polyvinyl alcohol composition.

2. The process of claim 1, wherein the the polyvinyl alcohol powder is at least about 2 wt %.

3. The process of claim 1, wherein step 4(a) is present.

4. The process of claim 3, wherein the particulate polyvinyl alcohol composition comprises:
(a) from about 70 wt % to about 99.5 wt % of polyvinyl alcohol granules,
(b) from about 0.5 wt % to about 20 wt % of (i) a polyvinyl alcohol powder that is smaller than 80 mesh size and is 325 mesh size or larger, or (ii) a polyvinyl alcohol powder that is 80 mesh size or larger and smaller than 35 mesh size, or (iii) a combination of (i) and (ii), and
(c) less than about 10 wt % combined of polyvinyl alcohol bigs and polyvinyl alcohol ultrafines,
wherein wt % is based on the total weight of the particulate polyvinyl alcohol composition.

5. The process of claim 4, wherein the the polyvinyl alcohol powder is at least about 2 wt %.

6. The process of claim 1, wherein step 4(b) is present.

7. The process of claim 6, wherein the particulate polyvinyl alcohol composition comprises:
(a) from about 70 wt iii to about 99.5 wt % of polyvinyl alcohol granules,
(b) from about 0.5 wt % to about 20 wt % of (i) a polyvinyl alcohol powder that is smaller than 80 mesh size and is 325 mesh size or larger, or (ii) a polyvinyl alcohol powder that is 80 mesh size or larger and smaller than 35 mesh size, or (iii) a combination of (i) and (ii), and
(c) less than about 10 wt % combined of polyvinyl alcohol bigs and polyvinyl alcohol ultrafines,
wherein wt % is based on the total weight of the particulate polyvinyl alcohol composition.

8. The process of claim 7, wherein the the polyvinyl alcohol powder is at least about 2 wt %.

9. A particulate polyvinyl alcohol composition comprising:
(a) from about 70 wt % to about 99.5 wt % of polyvinyl alcohol granules,
(b) from about 0.5 wt % to about 2.0 wt % of (i) a polyvinyl alcohol powder that is smaller than 80 mesh size and is 325 mesh size or larger, or (ii) a polyvinyl alcohol powder that is 80 mesh size or larger and smaller than 35 mesh size, or (iii) a combination of (i) and (ii), and
(c) less than about 10 wt % combined of polyvinyl alcohol bigs and polyvinyl alcohol ultrafines,
wherein wt % is based on the total weight of the particulate polyvinyl alcohol composition.

10. The particulate polyvinyl alcohol composition of claim 9, wherein the polyvinyl alcohol powder is at least about 2 wt %.

11. The particulate polyvinyl alcohol composition of claim 10, obtained by a process comprising the steps of:
(1) providing a polyvinyl alcohol in a liquid solvent in a reactor,
(2) recovering the polyvinyl alcohol from the reactor in the form of a deposit in, on or onto a receptacle wherein the deposit undergoes gelation to form a body that corresponds substantially to the shape of the receptacle,
(3) granulating the body to form a polyvinyl alcohol granule composition comprising at least about 90 wt % polyvinyl alcohol granules (based on the total weight of the polyvinyl alcohol granule composition composition), and
(4a) admixing the polyvinyl alcohol granule composition with from about 0.5 wt % to about 20 wt % (based on the total weight of the particulate polyvinyl alcohol composition) of a polyvinyl alcohol powder composition to form the particulate polyvinyl alcohol composition, wherein the polyvinyl alcohol powder composition comprises (i) a polyvinyl alcohol powder that is smaller than 80 mesh size and is 325 mesh size or larger, or (ii) a polyvinyl alcohol powder that is 80 mesh size or larger and smaller than 35 mesh size, or (iii) a combination of (i) and (ii); or
(4b) crushing the polyvinyl alcohol granule composition to form the particulate polyvinyl alcohol composition, wherein at least about 80 wt % of the particles in the particulate polyvinyl alcohol composition have a size that is 80 mesh or larger and smaller than 3 mesh, based on the total weight of the particulate polyvinyl alcohol composition.

12. A method of reducing the loss of one or more desired fluids from a subsurface formation, or from the confines of a wellbore installed within such formation, comprising applying a particulate vinyl alcohol composition to a wall of the formation that is accessible from the wellbore, wherein the composition comprises:
(a) from about 70 wt % to about 99.5 wt % of polyvinyl alcohol granules,
(b) from about 0.5 wt % to about 2.0 wt % of (i) a polyvinyl alcohol powder that is smaller than 80 mesh size and is 325 mesh size or larger, or (ii) a polyvinyl alcohol powder that is 80 mesh size or larger and smaller than 35 mesh size, or (iii) a combination of (i) and (ii), and
(c) less than about 10 wt % combined of polyvinyl alcohol bigs and polyvinyl alcohol ultrafines,
wherein wt % is based on the total weight of the particulate polyvinyl alcohol composition.

13. The method of claim 12, wherein the polyvinyl alcohol powder is at least about 2 wt %.

14. The method of claim 13, wherein the particulate polyvinyl alcohol composition is obtained by a process comprising the steps of:
(1) providing a polyvinyl alcohol in a liquid solvent in a reactor,
(2) recovering the polyvinyl alcohol from the reactor in the form of a deposit in, on or onto a receptacle wherein the deposit undergoes gelation to form a body that corresponds substantially to the shape of the receptacle, (3) granulating the body to form a polyvinyl alcohol granule composition comprising at least about 90 wt % polyvinyl alcohol granules (based on the total weight of the polyvinyl alcohol granule composition composition), and (4a) admixing the polyvinyl alcohol granule composition with from about 0.5 wt % to about 20 wt % (based on the total weight of the particulate polyvinyl alcohol composition) of a polyvinyl alcohol powder composition to form the particulate polyvinyl alcohol composition, wherein the polyvinyl alcohol powder composition comprises (i) a polyvinyl alcohol powder that is smaller than 80 mesh size and is 325 mesh size or larger, or (ii) a polyvinyl alcohol powder that is 80 mesh size or larger and smaller than 35 mesh size, or (iii) a combination of (i) and (ii); or (4b) crushing the polyvinyl alcohol granule composition to form the particulate polyvinyl alcohol composition, wherein at least about 80 wt % of the particles in the particulate polyvinyl alcohol composition have a size that is 80 mesh or larger and smaller than 3 mesh, based on the total weight of the particulate polyvinyl alcohol composition.

* * * * *